(12) United States Patent
Mercat et al.

(10) Patent No.: US 7,434,892 B2
(45) Date of Patent: Oct. 14, 2008

(54) DEVICE, INCLUDING A QUICK-TIGHTENING MECHANISM, FOR A CANTILEVERED MOUNTING OF A WHEEL TO THE FRAME OF A BICYCLE

(75) Inventors: Jean-Pierre Mercat, Chavanod (FR); Jean-Marc Hillairet, Nevers (FR)

(73) Assignee: Salomon S.A., Metz-Tessy (FR)

( * ) Notice: Subject to any disclaimer, the term of this patent is extended or adjusted under 35 U.S.C. 154(b) by 0 days.

(21) Appl. No.: 11/286,360

(22) Filed: Nov. 25, 2005

(65) Prior Publication Data
US 2006/0108859 A1  May 25, 2006

Related U.S. Application Data

(63) Continuation of application No. PCT/FR2004/001308, filed on May 27, 2004.

(30) Foreign Application Priority Data
May 28, 2003  (FR) .................................. 03 06545

(51) Int. Cl.
*B62K 25/04* (2006.01)
(52) U.S. Cl. ................................ 301/124.2; 301/110.5
(58) Field of Classification Search ............. 301/110.5, 301/110.6, 111.1, 124.2, 111.01, 111.07, 301/124.1; 280/288
See application file for complete search history.

(56) References Cited

U.S. PATENT DOCUMENTS

| | | | | |
|---|---|---|---|---|
| 4,028,915 A | * | 6/1977 | Stahl | 70/233 |
| 4,148,459 A | * | 4/1979 | Martinez | 251/149.6 |
| 4,400,038 A | * | 8/1983 | Hosokawa | 301/124.2 |
| 4,477,121 A | * | 10/1984 | Atkins | 301/112 |
| 4,679,862 A | * | 7/1987 | Luo | 301/112 |
| 4,724,692 A | * | 2/1988 | Turin et al. | 70/225 |
| 4,763,957 A | * | 8/1988 | Poehlmann et al. | 301/110.5 |
| 4,809,802 A | * | 3/1989 | Seino et al. | 180/231 |
| 4,964,287 A | * | 10/1990 | Gaul | 70/233 |
| 5,118,125 A | * | 6/1992 | Plunkett | 280/279 |
| 5,257,855 A | * | 11/1993 | Nagano | 301/110.5 |

(Continued)

FOREIGN PATENT DOCUMENTS

EP        0 094 649 A2    11/1983

(Continued)

*Primary Examiner*—Russell D Stormer
(74) *Attorney, Agent, or Firm*—Greenblum & Bernstein, P.L.C.

(57) ABSTRACT

A device for mounting a wheel of a bicycle on a frame, including: an inner hub rotatably mounted in a portion of the frame, an outer hub forming a central zone of the wheel, a quick-tightening mechanism that includes a male portion projecting from a first of the inner and outer hubs, a female portion provided in a second of the hubs, axial abutments for retaining the outer hub supported against the inner hub, and a mechanism for positioning the axial abutments, the positioning mechanism not being active upon completion of the tightening of the wheel. The quick-tightening mechanism is equipped with a lever that is pivoted by the operator to provide the necessary force for the axial tightening of the outer hub of the wheel against the inner hub. In a particular embodiment of the invention, the axial abutments include a plurality of balls, and the mechanism for positioning the axial abutments include ramps on which the balls roll.

21 Claims, 19 Drawing Sheets

U.S. PATENT DOCUMENTS

| | | | | |
|---|---|---|---|---|
| 5,326,157 | A * | 7/1994 | Nagano | 301/110.5 |
| 5,337,587 | A * | 8/1994 | Davidson | 70/233 |
| 5,339,660 | A * | 8/1994 | Fell | 70/233 |
| 5,452,381 | A | 9/1995 | Guerra | |
| 5,622,412 | A * | 4/1997 | Yamane | 301/124.2 |
| 5,673,925 | A * | 10/1997 | Stewart | 280/279 |
| 5,813,258 | A * | 9/1998 | Cova et al. | 70/225 |
| 6,089,675 | A * | 7/2000 | Schlanger | 301/124.2 |
| 6,149,245 | A * | 11/2000 | Wu | 301/111.06 |
| 6,152,541 | A * | 11/2000 | Huber | 301/124.2 |
| 6,276,760 | B1 * | 8/2001 | Everett | 301/124.2 |
| 6,435,622 | B1 * | 8/2002 | Kanehisa et al. | 301/110.5 |
| RE38,094 | E * | 4/2003 | Buchalter | 70/233 |
| 6,742,849 | B1 * | 6/2004 | Denby | 301/124.2 |
| 6,761,417 | B2 * | 7/2004 | Denby | 301/124.2 |

FOREIGN PATENT DOCUMENTS

| | | |
|---|---|---|
| EP | 0 612 629 A2 | 8/1994 |
| EP | 1 153 827 A1 | 11/2001 |
| FR | 538 144 A | 6/1922 |
| FR | 2 684 063 A1 | 5/1993 |
| WO | WO-2004/108514 A1 | 12/2004 |
| WO | WO-2004/108515 A1 | 12/2004 |

* cited by examiner

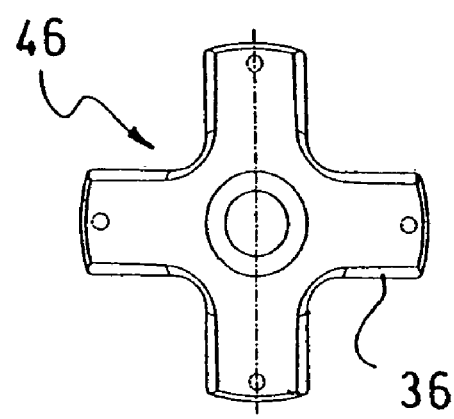
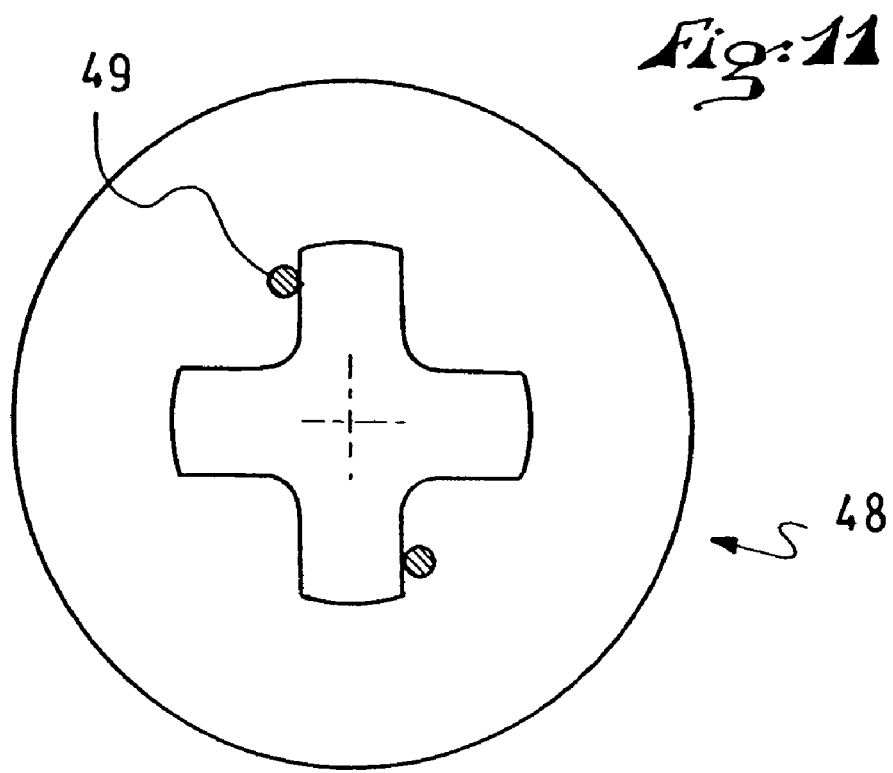

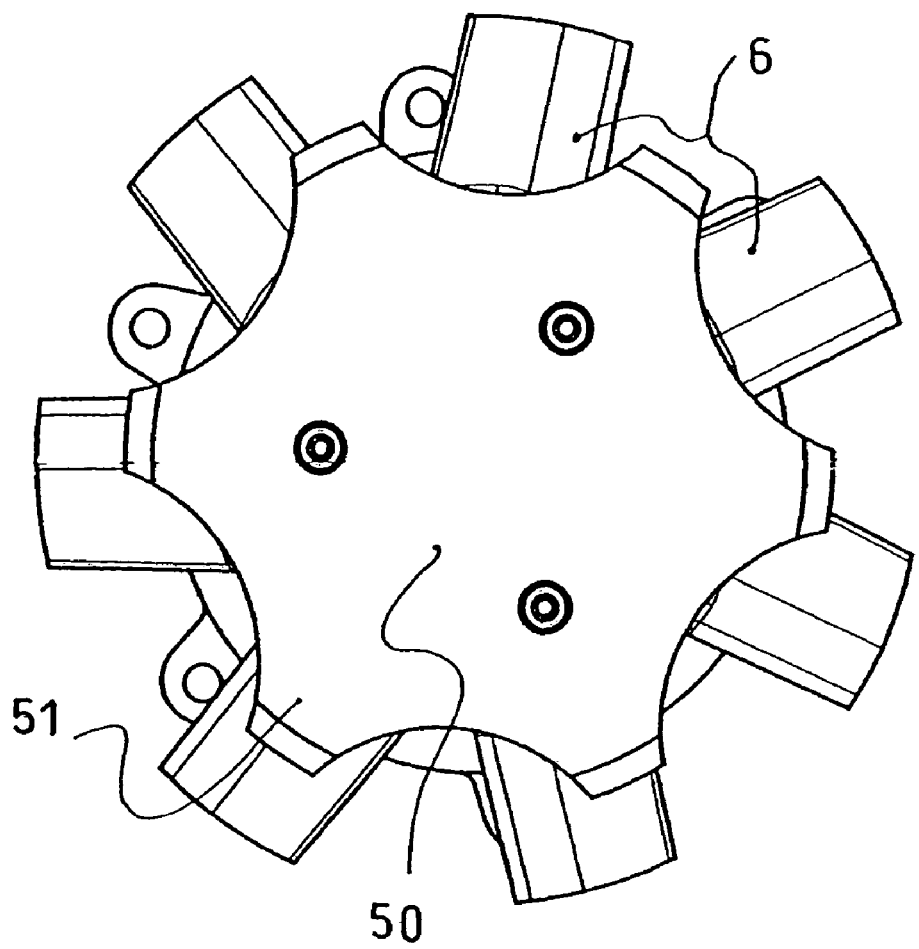

DEVICE, INCLUDING A QUICK-TIGHTENING MECHANISM, FOR A CANTILEVERED MOUNTING OF A WHEEL TO THE FRAME OF A BICYCLE

CROSS-REFERENCE TO RELATED APPLICATIONS

This application is a continuation of PCT International Patent Application No. PCT/FR2004/001308, filed on May 27, 2004, the disclosure of which is hereby incorporated by reference thereto in its entirety, and the priority of which is claimed under 35 U.S.C. §120, pursuant to the provisions of 35 U.S.C. §363.

This application claims priority under 35 U.S.C. §119 of French Patent Application No. 03.06545, filed on May 28, 2003, the disclosure of which is hereby incorporated by reference thereto in its entirety.

BACKGROUND OF THE INVENTION

1. Field of the Invention

The invention relates to a device for mounting a bicycle wheel to a frame with a quick-tightening mechanism, and a bicycle that includes such device. More particularly, the invention relates to such a device for mounting and demounting a bicycle wheel with a quick-tightening mechanism and, more particularly, for bicycles having frames with a projecting single arm, rather than a fork, the wheel hub being cantilevered from the single arm.

2. Description of Background and Relevant Information

French Patent Publication No. 2 684 063 discloses a device of the aforementioned type, in which tightening is carried out by means of a nut to ensure adequate tightening. In this type of mounting device, for use in the aforementioned type of bicycle frame, also referred to as frames having a single-arm, or single-arm fork, the tightening force must be more substantial than in the case of a conventional device, in which the wheel is mounted between the two arms of the fork. Connecting with a nut not only takes longer to accomplish, it is also not particularly practical as it requires a tool to be used in order to obtain adequate tightening and release.

Therefore, it is desirable to be able to use a single-arm type wheel mounting device having a tightening mechanism that does not require the use of tools in order to perform the necessary tightening and release, i.e., mounting and demounting of a wheel.

European Patent Publication No. 1 153 827 discloses a single-arm wheel mounting device that uses a quick-connect system. Disclosed is a mechanism that includes a clamp, the jaws of which are movable within a cone. To ensure a substantial tightening force, and so that it can be manually actuated, this mechanism must be equipped with a cone, in fact a truncated cone having a small apex angle, which is in principle less than 45°. This considerably increases the axial space requirement of the mechanism. However, it is known that the axial space requirement in a device for mounting a wheel is critical, particularly for the rear wheel, where the mounting of the wheel itself must share the axial volume with the rolling bearings, the driving gears and, possibly, the brake disk. Moreover, the efficiency of such a device is very minimal due to substantial friction between the various parts of the mechanism, especially between the clamps and inner surface of the cone.

In a single-arm wheel mounting device, a portion of the elements and functions usually found on the hub of a conventional wheel can advantageously remain on the frame permanently. These elements include an inner hub that is rotatably mounted on the frame by means of a rolling bearing, which bears the chain sprockets and possibly a brake disk, on the one hand, and an outer hub, which is specific to the wheel and groups the traction spokes, the compression spokes or the sides of the latter, on the other hand. The connection between the outer hub and the inner hub must be easily separable and must ensure a good transmission of forces.

In document EP 1 153 827, the quick-tightening mechanism is equipped with a lever that is rotated to produce the tightening force. The lever is mounted on an axle and includes a cam, the friction of which causes a loss in the tightening mechanism efficiency. This lever accompanies the wheel in its rotational movement and thereby constitutes a danger. Indeed, elements not related to the bicycle, such as cables or wires, may become entangled around the lever.

SUMMARY OF THE INVENTION

An object of the invention is to overcome the aforementioned drawbacks, and in particular to provide a device for mounting a wheel to a single cantilevered arm of a frame of a bicycle, and for demounting the wheel therefrom, hereafter referred to as a mounting device, which can be used with a quick tightening mechanism, and which is compact in the axial direction.

Another object of invention is to provide a wheel mounting device in which the tightening mechanism has improved efficiency.

Another object of the invention is to provide a wheel mounting device, the tightening mechanism of which substantially reduces the axial space requirement.

Another object of the invention is to provide a wheel mounting device that avoids any risks of outside elements, such as cables or wires, becoming entangled around a tightening lever.

Another object of the invention is to provide a wheel mounting device, the tightening mechanism of which has a safety device that prevents any ill-timed loosening and any risk of accidental demounting of the wheel.

The invention achieves the aforementioned objects by the provision of a device for mounting a bicycle wheel onto a frame, including:
- an inner hub rotatably mounted in a portion of the frame;
- an outer hub in a central zone of the wheel; and
- a quick-tightening mechanism equipped with a lever adapted to be pivoted by the operator to provide a force for the axial tightening of the outer hub against the inner hub;
- the quick-tightening mechanism including a male portion that projects from either one of the inner and outer hubs, a female portion provided in the other hub, axial abutment zones to retain the outer hub against the inner hub, and a mechanism that positions the axial abutment zones, and in which the mechanism that positions the axial abutment zones are not active upon completion of the tightening, that is, all axial abutment zones are in position before the end of the tightening phase.

In a device according to the invention, the tightening involves two phases. In the first phase, axial abutment zones are positioned by actuating a positioning mechanism. This positioning mechanism sets elements of the male portion and/or of the female portion into motion. Next, the tightening phase itself occurs, in which the axial abutment zones come in contact and are applied against one another, under constraint, by the tightening force.

According to the invention, the tightening force applied by the user is first used for positioning the axial abutment zones (first phase), and it is then entirely dedicated to the application of the axial abutment zones against one another (second phase). During this second phase, the only movement involved is an axial movement and no sliding friction is involved in any direction other than axial, which optimizes the tightening efficiency, particularly during the second phase.

Advantageously, the mechanism for positioning the axial abutment zones includes one or several pivots.

In a first embodiment, the mechanism for positioning the axial abutment zones advantageously includes one or several ramps on which one or more balls roll. Thus, friction is minimized during the axial abutment positioning phase, which contributes to an overall improved tightening efficiency.

Advantageously, the lever for actuating the tightening device is attached to the remainder of the device by means of a knuckle-joint/over-center mechanism.

In a third embodiment of the invention, the axial abutment zones comprise spacers, and the mechanism that positions the axial abutment zones includes a spring and a pivot on which the cams are mounted.

In a fourth embodiment of the invention, the abutment zones comprise spacers, and the mechanism that positions the abutment zones include ramps that enable the cams to switch from a central position to a peripheral position.

According to a fifth embodiment of the invention, the axial abutment zones are arranged in the form of a cross, and the mechanism that positions the axial abutment zones includes a mechanism for pivoting the cross, which is oriented along the axis of the wheel.

According to the fifth embodiment of the invention, the axial abutment zones are automatically positioned upon insertion of the male portion, constituted by a pin, in the female portion, constituted by a cavity closed by a diaphragm. During the tightening phase, the force exerted by the user is only then used to bring the abutment zones closer together axially.

In each of the embodiments of the invention, the quick-tightening mechanism is advantageously equipped with a safety device to prevent any ill-timed opening of the mechanism.

In each of the embodiments of the invention, the end of the lever, when the lever is folded, is advantageously protected by the spokes of the wheel in order to prevent any entanglement.

BRIEF DESCRIPTION OF THE DRAWINGS

Other advantages of the invention are described hereinafter and are the object of appended claims. The invention is described below with reference to the annexed drawings that show preferred embodiments thereof by way of examples, and in which:

FIGS. 10 and 11 are details of the fifth embodiment of the invention;

FIG. 12 shows a front view of a sixth embodiment of the invention;

DETAILED DESCRIPTION OF THE INVENTION

Figure 1:
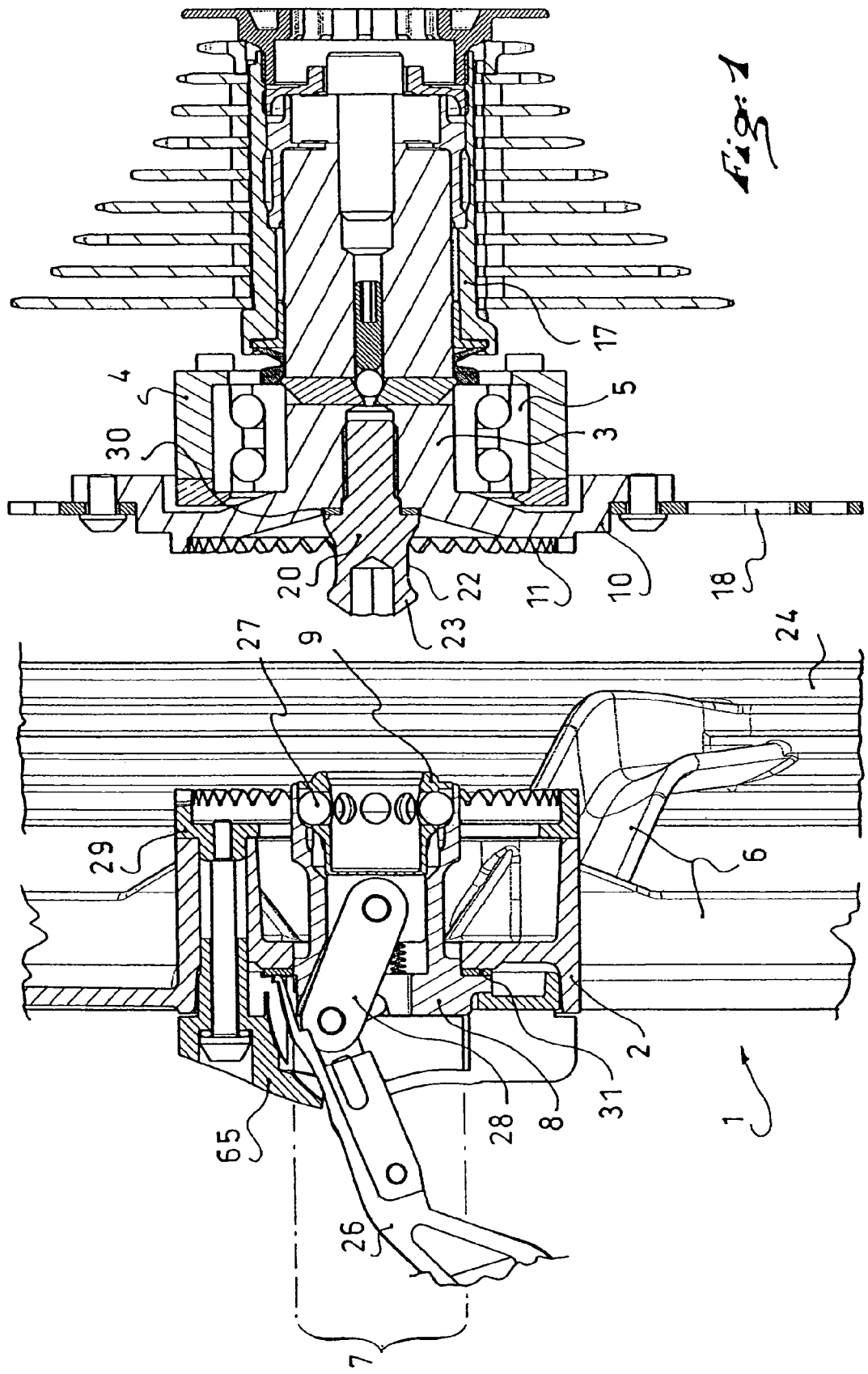
FIG. 1 shows a cross-sectional view of a first embodiment of the invention.

FIG. 1 illustrates the wheel mounting device according to a first embodiment of the invention. The right portion of FIG. 1 represents the bicycle, while the left portion represents the wheel. The bicycle is only visible from the end of the frame 4 on which the inner hub 3 is fixed. Although further details of the bicycle itself, including the bicycle frame, are not necessary to understand the invention, the invention can be embodied with a bicycle like that disclosed, for example, in the commonly owned U.S. Patent Application No. U.S. Patent Application Publication No. 2006/0108858, the disclosure of which is hereby incorporated by reference thereto in its entirety, and family member PCT International Publication No. WO 2004/108515. Those disclosures are not to be considered limiting to the invention, as the invention can be implemented with other bicycle details.

The inner hub 3 of the bicycle, shown on the right portion of FIG. 1, is rotatably mounted by means of rolling bearings 5, or other suitable bearings. The inner hub 3 is provided to receive, on one of its ends, the free-wheel body 17, which has not been described in further detail herein. The presence of this free-wheel body is conditioned by the fact that the illustrated example is that of a rear bicycle wheel. In the case of a front wheel, the inner hub 3 is not provided with this lengthening piece supporting the free-wheel body. At the other end, the free-wheel body 17 includes a plate 10 from which a plurality of teeth 11 project axially. The teeth 11 are arranged along a first circle centered on the axis of rotation of the inner hub 3, with each of the teeth having its top ridge oriented axially. The plate 10 further includes lugs that are used for attaching a braking disk 18. The front surface of the plate 10 has the shape of a truncated reinforcement at the bottom of which a threaded bore is provided. This bore receives a pin 20 that is screwed therein until a shoulder becomes supported on the front surface of the plate 10. A first washer 30 with a predeterminate thickness is inserted between the pin 20 and the plate 10 so as to adjust the axial position of the pin 20. The pin 20 includes a groove 22 and an end piece 23.

The left portion of FIG. 1 partly represents the wheel 1, of which the rim 24, the outer hub 2, and some of the compression spokes 6 that connect the rim 24 to the outer hub 2 are shown. The entire central portion of the outer hub 2 is substantially recessed so that the female portion of the quick-tightening mechanism 7 can be housed therein. The outer hub 2 of the wheel includes a circular support surface against which a toothed crown 29 is positioned. The crown 29 is equipped with a plurality of teeth arranged along a second circle identical to those arranged on the plate 10 of the inner hub 3. The cooperation of the teeth of the inner hub 3 and those of the outer hub 2 ensures the transmission of the axial forces, of the chain driving torque, and of the braking torque between the wheel and the bicycle. In a particular embodiment, the teeth are arranged along a circle having a diameter greater than 25 millimeters (mm). The crown is fixed to the inner hub by means of three screws. The female portion of the tightening mechanism includes a cover 8 fixed to the outer hub 2. A second washer 31 with a predeterminate thickness is axially inserted between the cover and the outer hub so as to ensure an accurate axial positioning of the female portion of the tightening mechanism. A cage 9 retaining eight balls 27 slides within the cover 8. The cage 9 is actuated translationally by means of a link 28 and of a lever 26.

Figure 4:
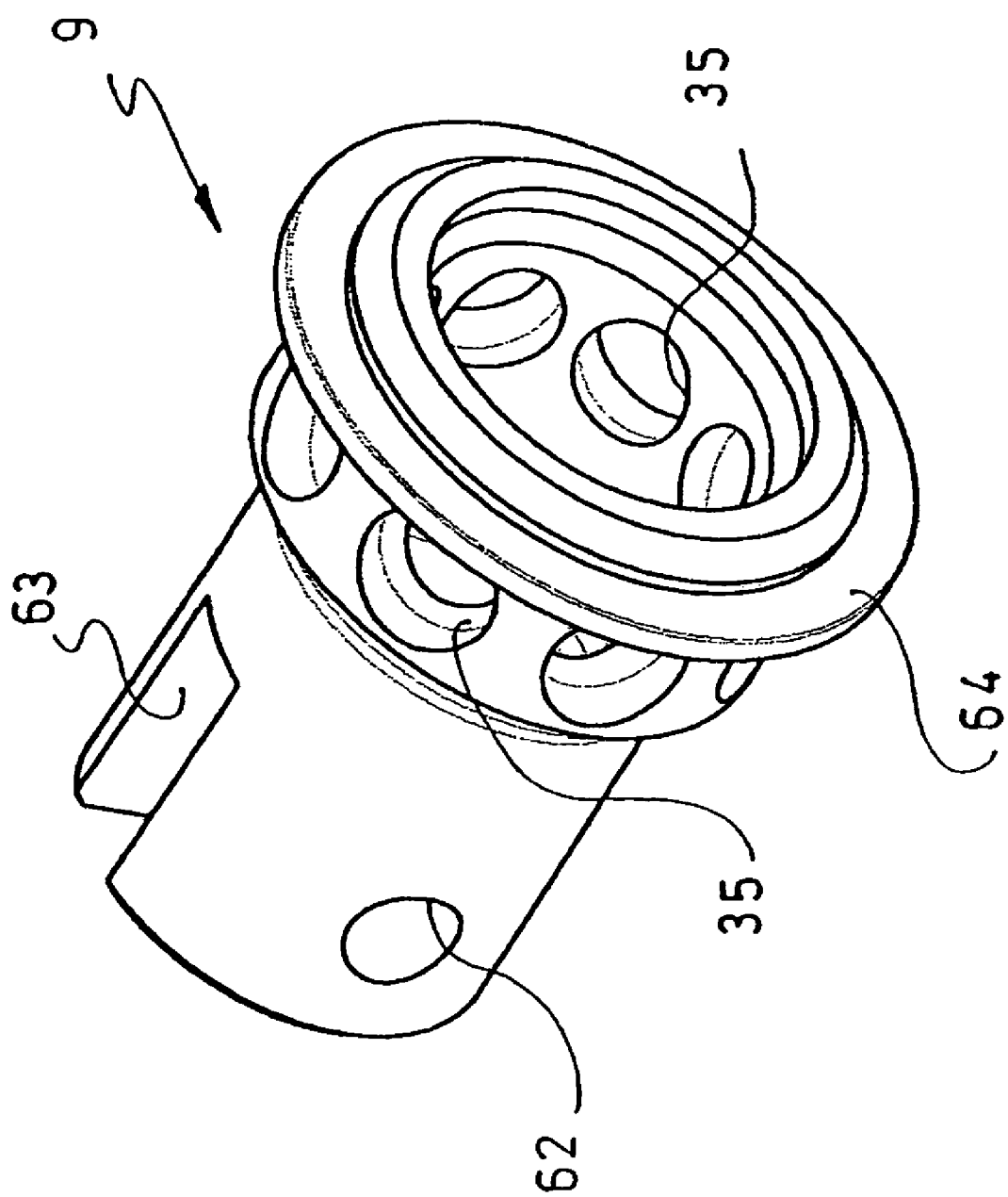
FIG. 4 shows the ball cage isolated from the remainder of the device.

In FIG. 4, the cage 9 is shown separated from the remainder of the device. The cage 9 includes a solid portion and a hollow portion. Extending through the solid portion, shown at the left of FIG. 4, is a transverse bore 62 and a slot 63 perpendicular to the bore. A pin or axle is inserted in the bore 62 to serve as a pivot for the link 28. The link 28 is positioned in the slot. The hollow portion is sized so as to receive the end of the pin of the male portion of the device. Eight housings 35 are arranged so as to extend through the peripheral wall. Each of the housings 35 receives a ball 27. The diameter of the housings 35 in the area of the inner surface of the cage is substantially smaller than the diameter of the ball 27 itself in order to prevent the latter from exiting the housing 35 from within the cage 9. The number of eight balls for the quick-tightening mechanism is not intended to be limiting. The cage 9 also includes a sealing lip 64 that prevents dirt from penetrating in the female portion of the tightening mechanism.

Figure 5:
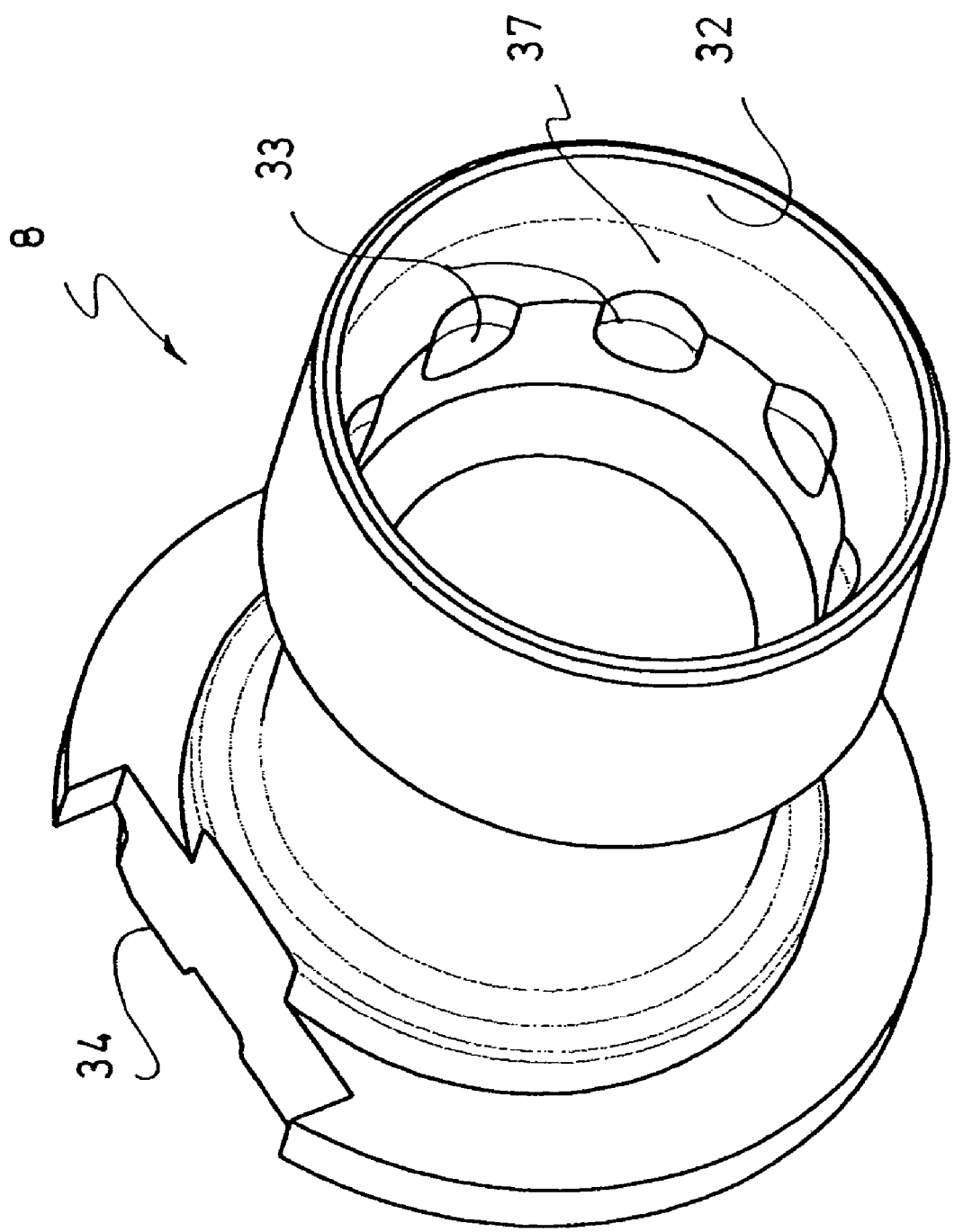
FIG. 5 shows the cover isolated from the remainder of the device.

In FIG. 5, the cover 8 is shown separate from the remainder of the device. The cover 8 is substantially shaped as a sleeve, having at one of its ends a support collar that is provided to be supported on the outer hub 2, possibly by means of a washer. The inside of the cover 8 receives the cage 9 and includes, at its other end, a widened portion 32, or widening, that is preceded by eight cells 33. The widened portion 32 has a cylindrical surface. The bottom of each cell 33 is closer to the axis than the bottom of the widening 32. A ramp 37 is located between the widening 32 and each of the cells. The set of eight ramps 37, in the illustrated embodiment, comprises part of a mechanism that positions the axial abutments. Advantageously, the cells have a circular shape extending in a plane perpendicular to the axis, the radius of which is substantially the same as the radius of the balls. When the balls 27 are in contact with the cells 33, the contact pressure is less than in the case of a point contact. Consequently, the deformation energy generated by this contact is also less substantial. For this reason, the tightening reproducibility is very good, and it is possible to use softer materials. However, the eight cells 33 could be replaced by a single cylindrical surface, provided that a very hard material is used, if the same level of performance and reproducibility is desired. Similarly, the cylindrical widening 32 can also be replaced with eight discrete widened zones. The cover 8 is closed by a lid 34, which has an opening allowing for the passage of the link 28. A cap 65 is located above the lid 34, as shown in FIG. 1. Three screws fix the cap 65 and the crown 29 to the outer hub 2.

A spring is arranged between the cage 9 and the cover 8, which, when the lever 26 is open, pushes the cage 9 into the open position, thus giving it a stable position. Due to the presence of the knuckle-joint (the lever being pivotable on the lid 34 and on the link 28), when the lever is in the closed position, this spring also retains the cage 9 and the lever in a stable position. The presence of this spring is particularly advantageous for carrying and handling the wheel independently of the bicycle, because the lever 26 remains against one of the compression spokes. The presence of the spring is also advantageous during the positioning of the wheel on the inner hub 3 because, without any other handling of the lever, the lever remains in the open position.

Figure 2:
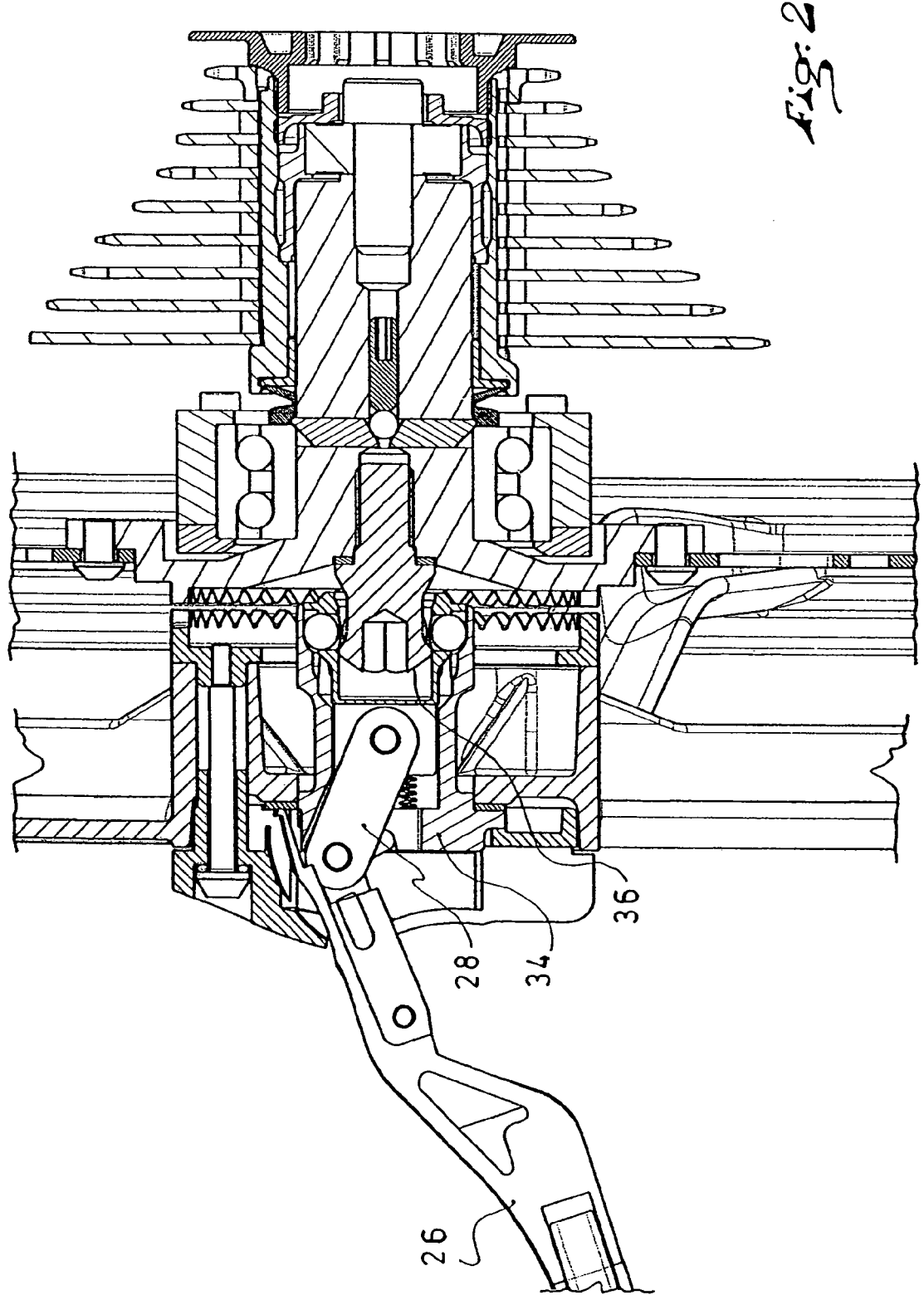
FIG. 2 shows the device of FIG. 1 during the positioning of the wheel.

FIG. 2 illustrates the mounting device for the wheel during the positioning of the device on the inner hub 3. Before having assumed the FIG. 2 position, the lever 26 would have been actuated in order to open the quick-tightening mechanism. The lever 26 is in pivotable support on the lid 34 of the cover, and it is also connected to the link 28 by means of a second pivot. A knuckle-joint, or over-center joint, is thus created. Therefore, in the open position, the lever is oriented substantially along the axis of the wheel. The cage 9 is translated outward of the cover 8, i.e., toward the right in FIG. 2, by means of the link 28. In this position, the housings 35 of the cage 9, as well as the balls 27 which they retain, face the widening 32 of the cover 8. When the wheel is brought closer to the inner hub, the chamfer 36 of the projecting end of the pin 20 drives the balls outward, until they come in contact with the cover 8. The inner diameter of the widening 32 is such that, when the balls are pressed thereto, the pin 20 can continue to be inserted in the cage 9 until the teeth of the outer hub come in contact with those of the inner hub.

The next step involves positioning the axial abutment arrangement that comprises the cooperation of the balls 27, or abutment elements, and an enlargement of the pin 20 which, in this embodiment, is the end piece 23. This step occurs during the first part of the range of pivoting of the lever 26, during what can be called a wheel mounting phase. Thus, the cage 9 as well as the balls 27 are axially brought back within the cover 8. The axial movement of the balls 27 causes them to go from the widening 32 to the cells 33; this radially brings them back inward until they are in the groove 22 of the pin 20. At this point, the wheel is in position, mounted on the frame but the mounting of the wheel is not yet tightened. Tightening is then completed, as described below, during a wheel tightening phase, while the positioning mechanism is not active, i.e., the radial positioning of the abutment arrangement, or elements, of the quick-tightening mechanism having been completed.

Finally, the tightening step occurs during the second part of the range of pivoting of the lever 26. The cage 9 continues to be axially positioned inward of the cover 8. The balls 27 accompany the axial movement of the cage 9 and come in contact with the end piece 23 of the pin 20. Pivoting of the lever until the end of its pivot range increases the contact pressure between the balls and the end piece 23, as well as between the teeth of the plate 10 and those of the crown 29. In this last step, the force provided by the user in pivoting the lever is only used for the axial movement of the elements of the abutment arrangement of the mechanism toward one another. In this movement, the friction is reduced to the minimum. Moreover, due to the knuckle-joint, the user benefits from an assisted tightening at the end of the lever travel range.

Figure 3:
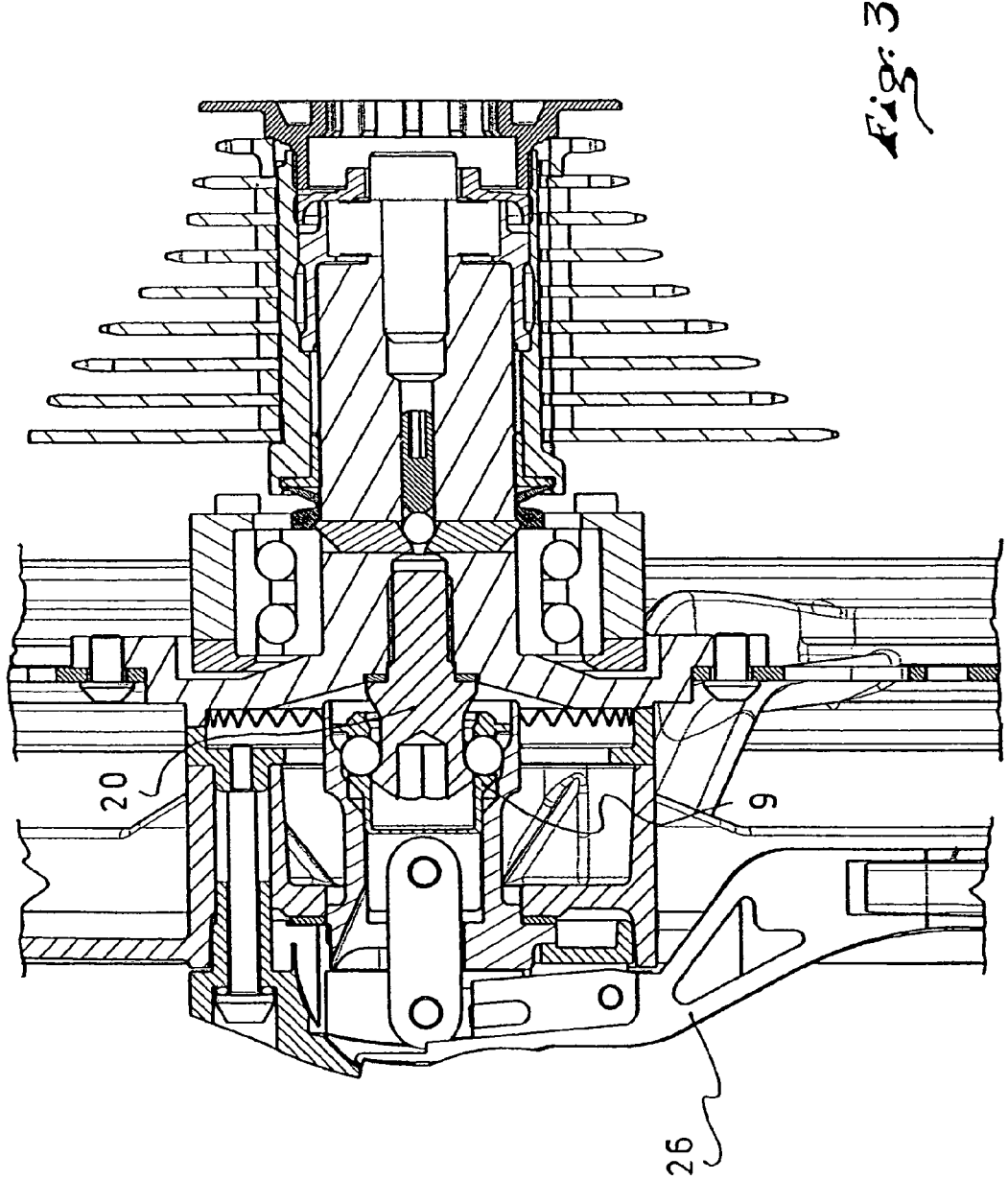
FIG. 3 shows the device of FIG. 1 when the wheel is in position.

FIG. 3 depicts the positions of the various parts in the final step. Specifically, the lever 26 is pressed against one of the compression spokes of the wheel in order to avoid any risk of ill-timed entanglement of any cable or wire or other object, the cage 9 is inserted into the cover 8 to the maximum. The balls 27 are forced to project through the cells 33 upon contact with the pin 20.

Figure 19:
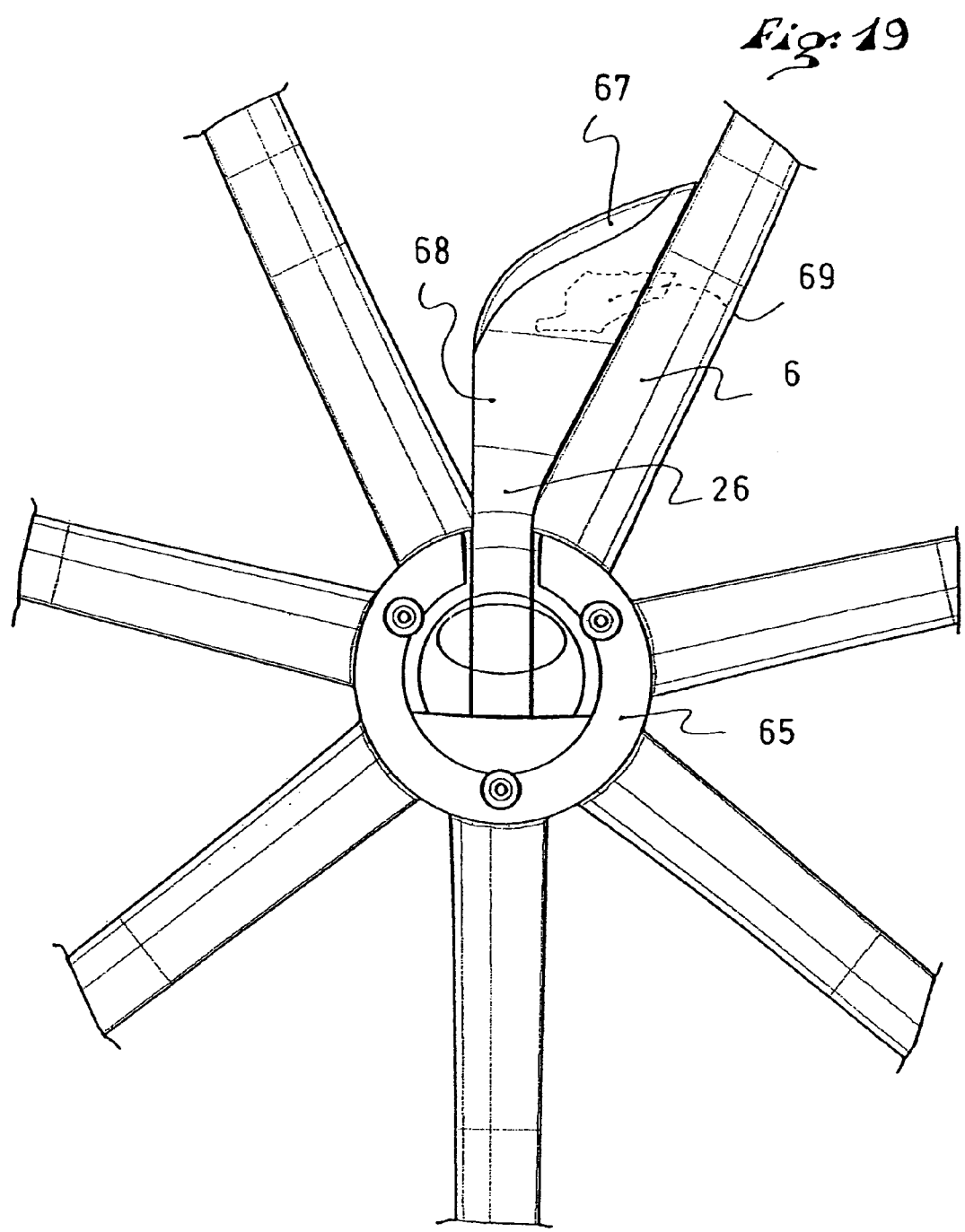
FIG. 19 shows a front view of the first embodiment of the invention.
Figure 20:
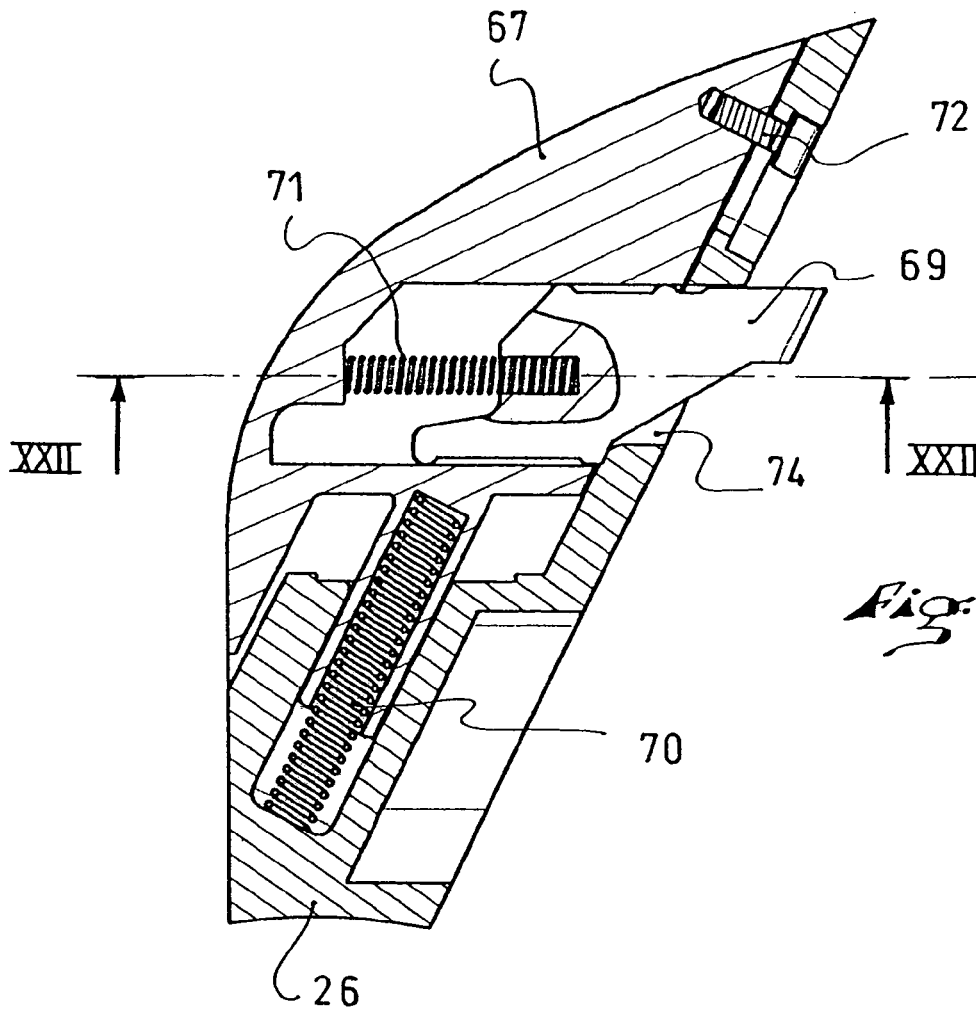
FIGS. 20, 21, 22 show detailed views of the lever according to the first embodiment of the invention.
Figure 21:
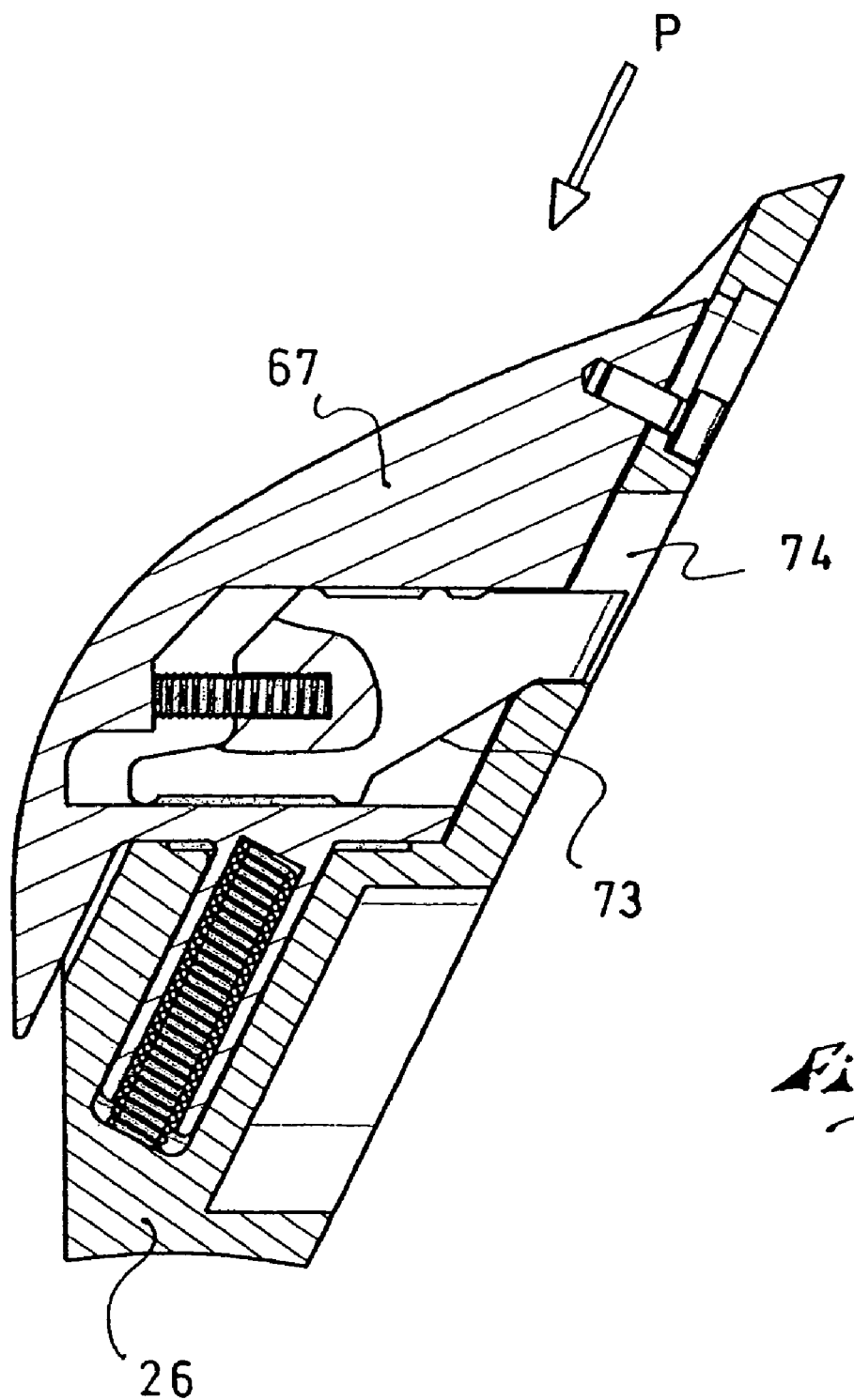

FIG. 19 illustrates a front view of the wheel equipped with the quick-tightening mechanism according to the first embodiment of the invention. In FIG. 19, the lever 26 is in the closed position, and it is folded against one of the compression spokes 6. It does not present any projecting end, which prevents any possibility of hooking an outside element not related to the bicycle. Furthermore, it is equipped with a safety device, thereby preventing any accidental opening thereof. FIGS. 20 and 21 show the composition and functioning thereof.

The safety device is housed in the body 68 of the lever 26. The safety device includes a push-button 67, or actuator, and a latch 69. The push-button 67 is slidably mounted in the body of the lever 26, this mounting being ensured by the translation of a bushing, extending from the base of the push-button in a corresponding bore provided in the body of the lever, and by the sliding of a return screw 72 in a slot of the lever 26. A spring 70 retains the push-button in a high, or extended, position relative to the lever 26. The latch 69 is slidably mounted in a housing of the push-button 67, and the latch 69 is biased out of this housing by a latch spring 71. A lever opening 74 is provided in the surface of the lever 26 that comes in contact with the compression spoke when the lever is folded. This lever opening 74 faces the housing of the latch 69 of the push-button and prevents the push-button from coming out completely, because it is narrower than the end of the latch 69.

Figure 22:
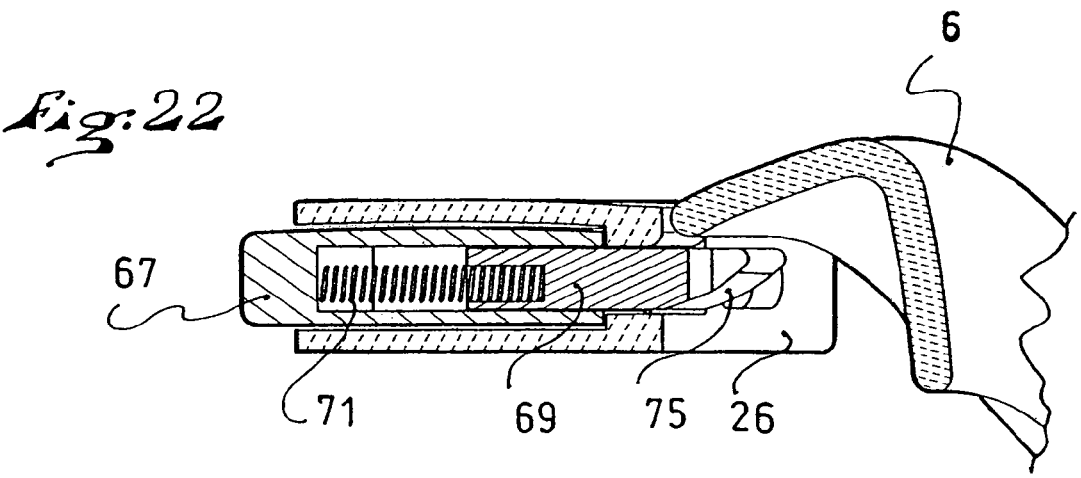

In FIG. 20, the push-button 67 is shown in a stable position, the latch 69 projecting through the opening 74 of the lever 26. It is in this position that the safety device is found when the user pivots the lever toward its folded position. When the lever 26 comes in contact with the spoke of the wheel, the latch 69 retracts in its housing. An inclined plane 75 facilitates this retraction. Pivoting the lever 26 brings it to the folded position, and the latch 69 recovers its projecting stable position shown in FIG. 20; the surface of the latch 69 then in contact with the spoke is parallel to the latter and does not permit any retraction thereof. The lever 26 is therefore secured and cannot be opened accidentally. FIG. 22 shows a cross-section of the lever 26 in the secured position along the spoke 6, and makes it possible to see the inclined plane 75 that assists the retraction of the latch 69 when the lever passes against the spoke 6.

In order to open the lever 26, it is necessary to press on the push-button 67. That is, a manipulation is required in addition to the mere pivoting of the lever required for demounting the wheel. In this embodiment, such manipulation is in the form of pressure applied to the push-button, which retracts the latch 69 due to the cooperation between the catch ramp 73 and the edge of the opening 74. FIG. 21 shows the respective position of the elements of the safety device when a pressure P is applied to the push-button 67. The lever 26 can then pass along the spoke 6, and the actuation of the quick-tightening mechanism can take place.

The safety device is entirely contained in the body of the lever 26, which has an aerodynamic shape in order to increase the performance of the wheel.

Figure 6:
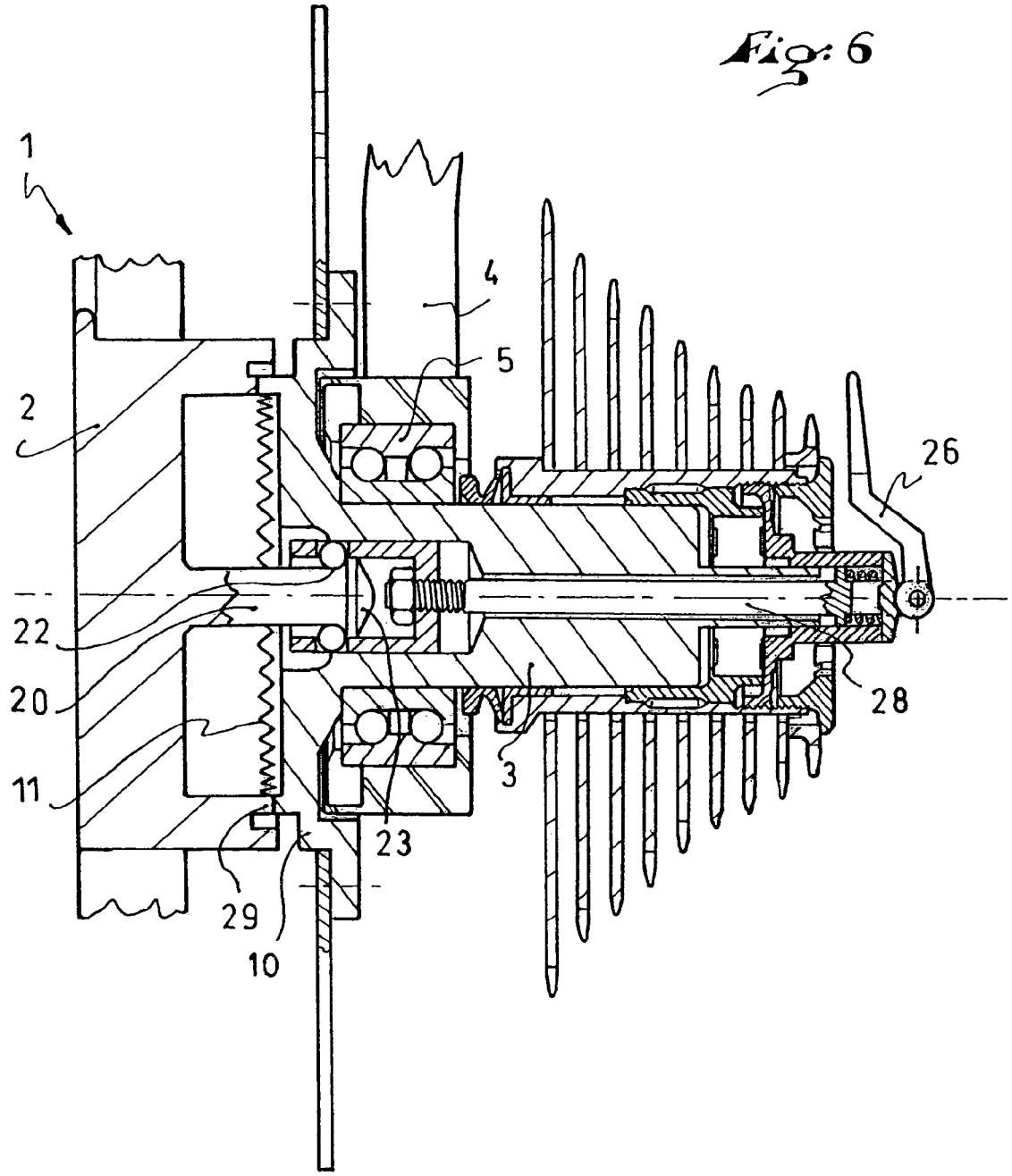
FIG. 6 shows a second embodiment of the invention.

FIG. 6 illustrates a second embodiment of the invention. The rear wheel 1 includes a rim and an outer hub 2 connected to one another by a plurality of compression spokes. As in the preceding embodiment, the compression spokes are not rectilinear, but have an offset so as to bring the median plane of the wheel, defined by the center of the rim, as close to the median plane of the frame 4 as possible. The outer hub 2 includes a crown 29 having a diameter greater than 50 mm, and at the top of which a plurality of teeth 11 are arranged. A pin 20, provided at its end with a groove 22 and a chamfered end piece 23, is arranged at the center of the crown. The inner hub 3 is rotatably mounted in a bore of the frame 4 by means of a ball bearing 5. The hub includes a cylindrical body 16 on which the free-wheel body is mounted, and a plate 10 used for attaching a braking disk and for arranging an axial support in the form of a plurality of teeth.

The female elements of the tightening mechanism are arranged within the inner hub 3. They include a ball cage slidably mounted and actuated by a rod 28 and a plurality of balls. The balls 27 are confined in through-openings of the ball cage. The bore in which the ball cage slides includes, at its open end, a shoulder that is preceded by as many ramps as there are balls. The rod 28 drives the ball cage inside the bore, and the ramps, which constitute the mechanism for positioning the arrangement of axial abutments, force the balls toward the axis. Once the balls are in position, the tightening force is entirely used to press the balls under constraint against the male portion of the tightening mechanism. The rod 28 extends through the inner hub. Its free end includes a cam lever 26 that is pivotally mounted. The cam lever rests on a cover fixed to the inner hub. A spring is arranged between the tie rod and the cover to ensure a constant contact between the cam and the cover.

Figure 7:
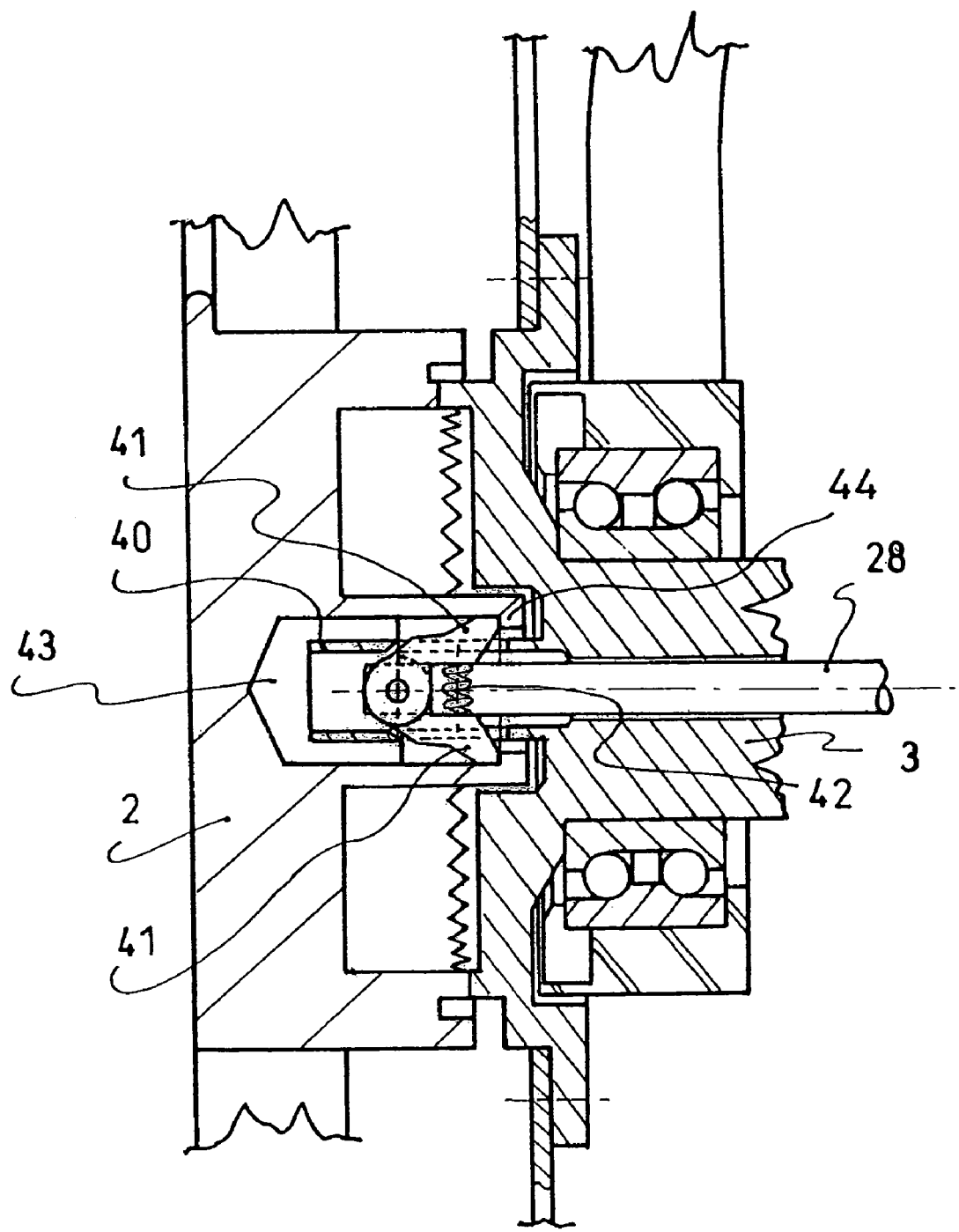
FIG. 7 shows a third embodiment of the invention.

FIG. 7 shows a third embodiment of the invention. The outer hub 2 of the wheel includes an axial support arrangement in the form of a plurality of teeth distributed on a crown. A shouldered cavity 43 is arranged within this crown.

The inner hub 3 includes a plate at the periphery of which is arranged an axial support arrangement constituted by teeth complementary to those arranged on the outer hub. A bushing 40 that is fixed on the inner hub 3, or is made in one-piece therewith, projects from the center of the plate. The inside of this bushing is occupied by an arrangement of axial abutments and the device for positioning them. As in the preceding embodiment, the actuation of the tightening mechanism occurs by means of a rod 28 that extends within the inner hub 3 and is translationally driven by a pivotable lever. This portion of the mechanism is not shown in FIG. 7. The end of the rod 28, which is integrated into the bushing, includes an axial groove. Two pivotable cams 41 are mounted in the axial groove. As shown, a single pin or axle fixes the cams 41 to the rod 28 and they are mutually pressed outward by means of a spiral spring 42. Two openings are provided in the bushing 40, opposite the cams 41, allowing the cams to project outwardly from the bushing 40 depending upon the axial position of the rod 28.

The cavity 43 of the outer hub 2 receives the bushing 40 when the wheel is in position on the inner hub 3. At the inlet of this cavity is arranged a shoulder 44 provided to cooperate with the ends of the pivotable cams 41. The cams and the shoulder constitute the axial abutment positioning mechanism of the quick tightening mechanism. The functioning of the quick tightening mechanism is as follows: In the first portion of the lever pivoting range, the rod 28 axially displaces the pivot point of the two cams 41. The edges of the cams 41 slide against the openings provided in the bushing 40, and they are pressed by the spiral spring 42 to deploy out of the bushing. Thus, the ends of the cams which comprise the axial abutments of the quick-tightening mechanism are opposite the shoulder. After this first axial abutment positioning phase, the pivoting of the lever causes an axial displacement of the rod 28 and the outward deployment of the cams 41; then, when the ends of the cams are in contact with the shoulder 44, this contact is placed under pressure. This is the tightening phase itself.

Figure 8:
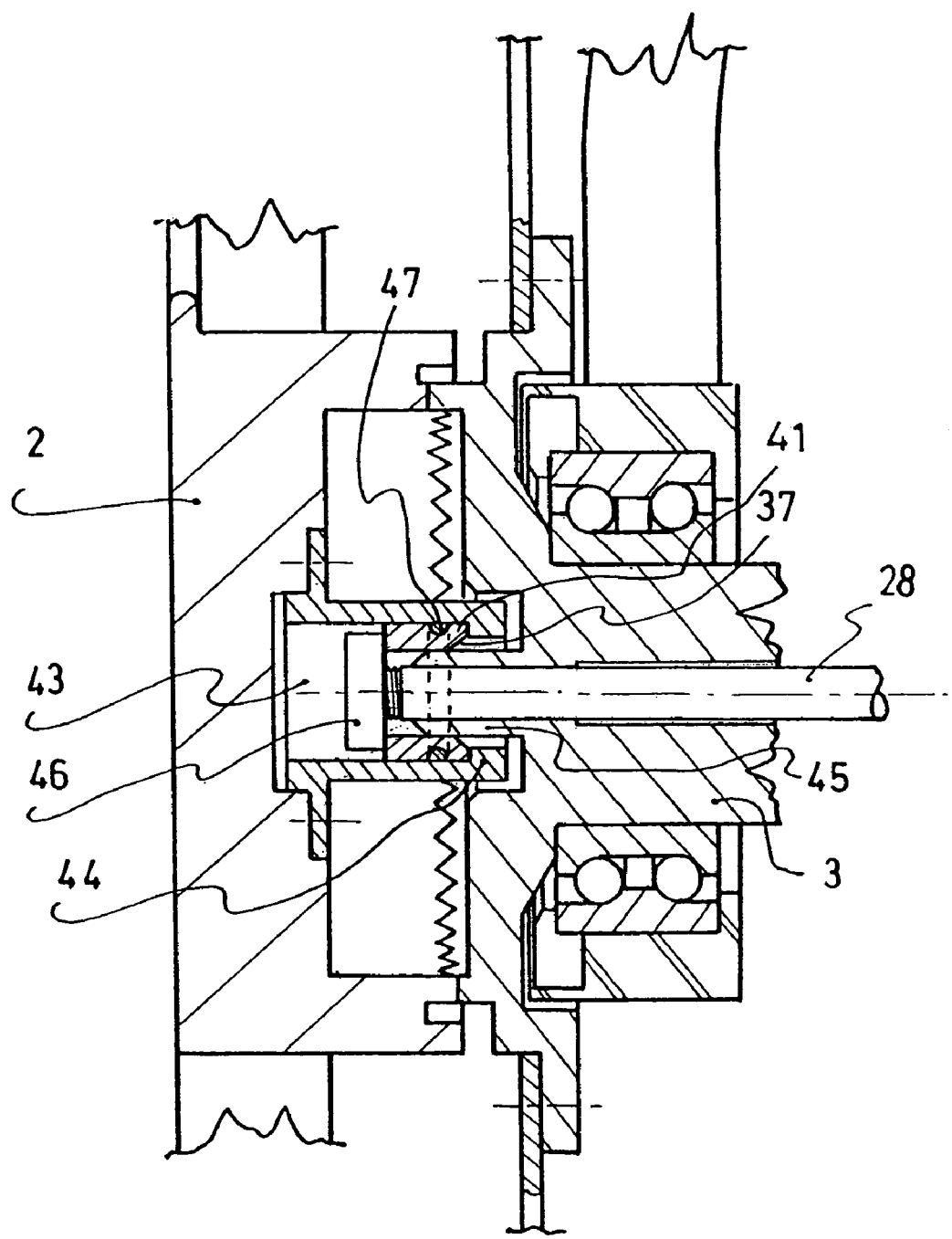
FIG. 8 shows a fourth embodiment of the invention.

FIG. 8 illustrates a fourth embodiment of the invention. The outer hub 2 of the wheel includes a cavity 43 at the inlet of which a shoulder 44 is located. The male portion includes a rod 28 that can slide in the inner hub 3 and is actuated by a lever. The rod 28 exits the inner hub 3 from a collar 45. A head 46 is fixed at the end of the rod. A plurality of cams 41 are positioned between the head 46 and the collar 45. These cams are pressed against the rod 28 by means of an elastic ring 47. This set of cams thus forms an extensible bushing around the rod 28. The cams have ramps 37 at their ends that are adjacent the collar 45. When the rod 28 is translated toward the inner hub 3, the ramps 37 slide against the collar 45 until the cams 41 straddle the collar 45. After this axial abutment positioning phase, the translational movement of the rod 28 brings the cams 41 in contact with the shoulder 44 of the cavity 43, and then places this contact under pressure. FIG. 8 precisely depicts the state of the elements when tightening is completed. During the separation of the wheel, the opening of the lever translates the rod 28 and moves the head 46 away from the inner hub. A slight axial traction on the wheel from the user drives the cams which, as soon as they move past the end of the collar, are moved against the rod. The traction movement on the wheel enables the complete removal of the wheel.

Figure 9:
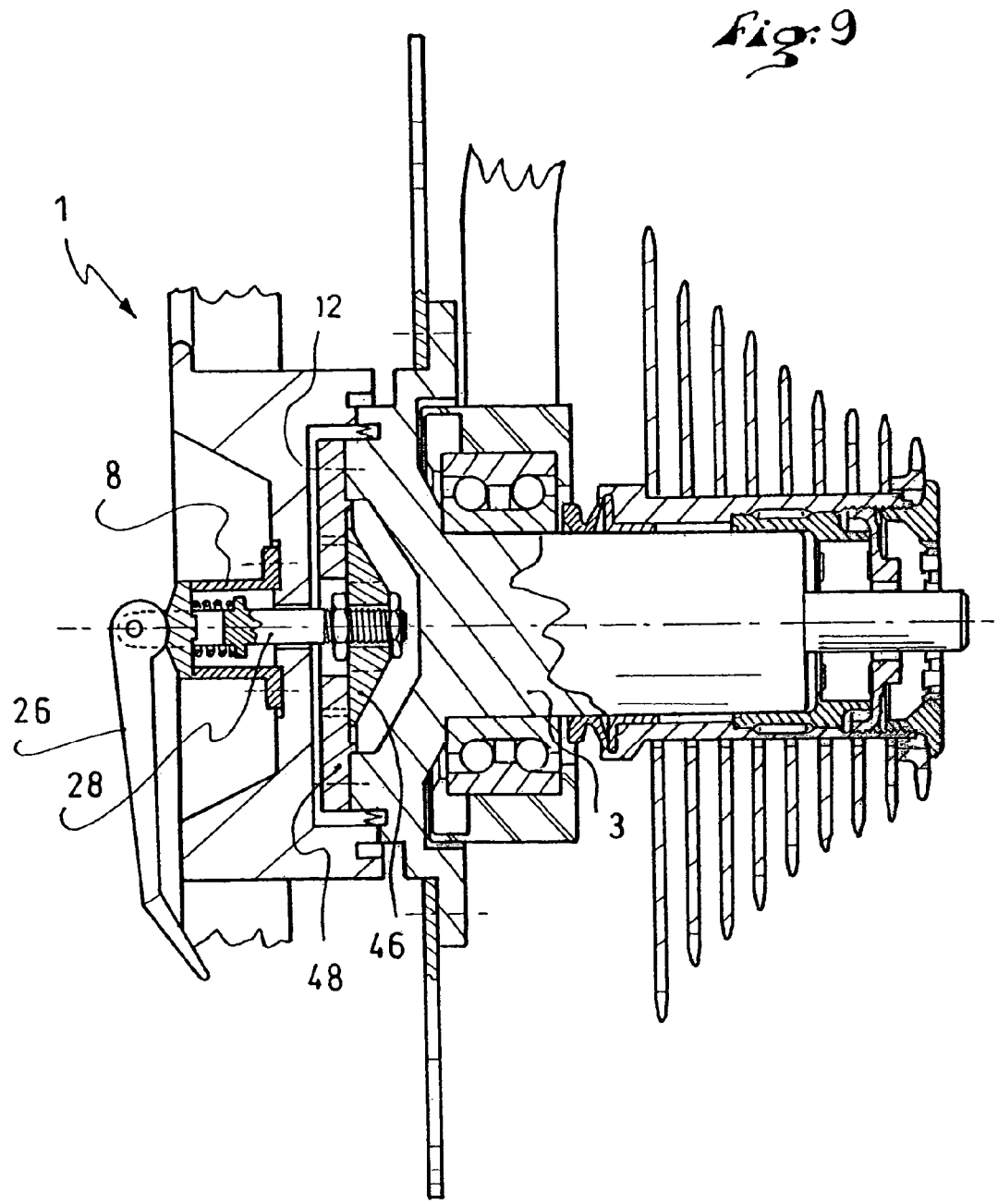
FIG. 9 shows a fifth embodiment of the invention.

FIG. 9 shows a fifth embodiment of the invention, in which the female portion of the device is provided in the inner hub 3. It is a cavity closed by a plate 48 in which a cross-shaped opening is provided. The plate 48 is fixed on the toothed plate by means of screws 12. The wheel 1 is equipped with the male portion of the quick-tightening mechanism. A cover 8 is fixed on the outer hub of the wheel. Within this cover, a rod 28 slides and rotates about its axis. The translation of the rod 28 is caused by the rotation of the lever 26 and by means of a cam. The rod 28 extends through the inner hub 3, and a head 46 is fixed at the end thereof. This head 46 has a shape that is complementary to that of the opening provided in the plate 48.

FIG. 10 shows a top view of the head 46. The head 46 has a cross-shaped contour, and each of the arms of the cross has a planar lower surface oriented along a plane perpendicular to the axis of the wheel 1, and an upper surface inclined relative to said axis. The lower surface of the head 46 constitutes the abutment surface of the male portion. A threaded hole is located at the center of the head 46, which enables the head to be screwed onto the threaded end of the rod 28. Two nuts, shown in FIG. 10, screwed onto both sides of the head 46, make it possible to axially position the head and retain the head in position on the rod 28. In order to facilitate its insertion through the plate, the head is equipped with a chamfer on its periphery.

FIG. 11 shows a front view of the plate 48. The opening 13 that is arranged therein is at least larger than the contour of the head 46 that must be capable of being arranged therein. The cross shape is only one alternative selected from a number of possible shapes for the contour of the head. It can be replaced by a structure having one or several arms. The inner surface of the plate, i.e., that which is directed inward of the cavity is planar and constitutes the abutment surface of the female portion of the quick-tightening mechanism. A swivel pin 49 is lodged in the plate 48, in the vicinity of one of the elongated portions of the cross-shaped opening. This swivel pin projects from the inner surface of the plate 48.

Prior to positioning the wheel, the user ensures that the lever 26 is indeed in the open position. The user then brings the wheel closer so that the inner and outer support arrangements/zones constituted by the plurality of teeth face one another. Thus, the head 46 penetrates in the cavity until the teeth are indeed in contact. The penetration of the head 46 in the opening is assisted by the presence of chamfers 36 arranged on the upper surface of the head. The first phase of actuating the quick-tightening mechanism then involves positioning the arrangement of axial abutments by rotating the lever/rod/head subassembly. The rotation of this subassembly continues until the lateral surface of one of the arms of the head 46 comes in contact with the swivel pin 49. In this position, the lower surface of the head faces the inner surface of the plate. In the second phase of actuating the tightening mechanism, the lever 26 is pivoted to the closed position, which brings back the rod 28 toward the outer hub 2. The head 46 comes in contact with the inner surface of the plate and putting pressure on this contact ensures the tightening.

The loosening of the wheel 1 involves the following two steps: the pivoting of the lever in the open position in order to release the contact between the axial abutments of the tightening mechanism, and the rotation of the lever/rod/head subassembly in order to place the head 46 in correspondence with the opening of the plate 48. The presence of the swivel pin in the vicinity of this opening facilitates the positioning of the head opposite the opening.

Figure 13:
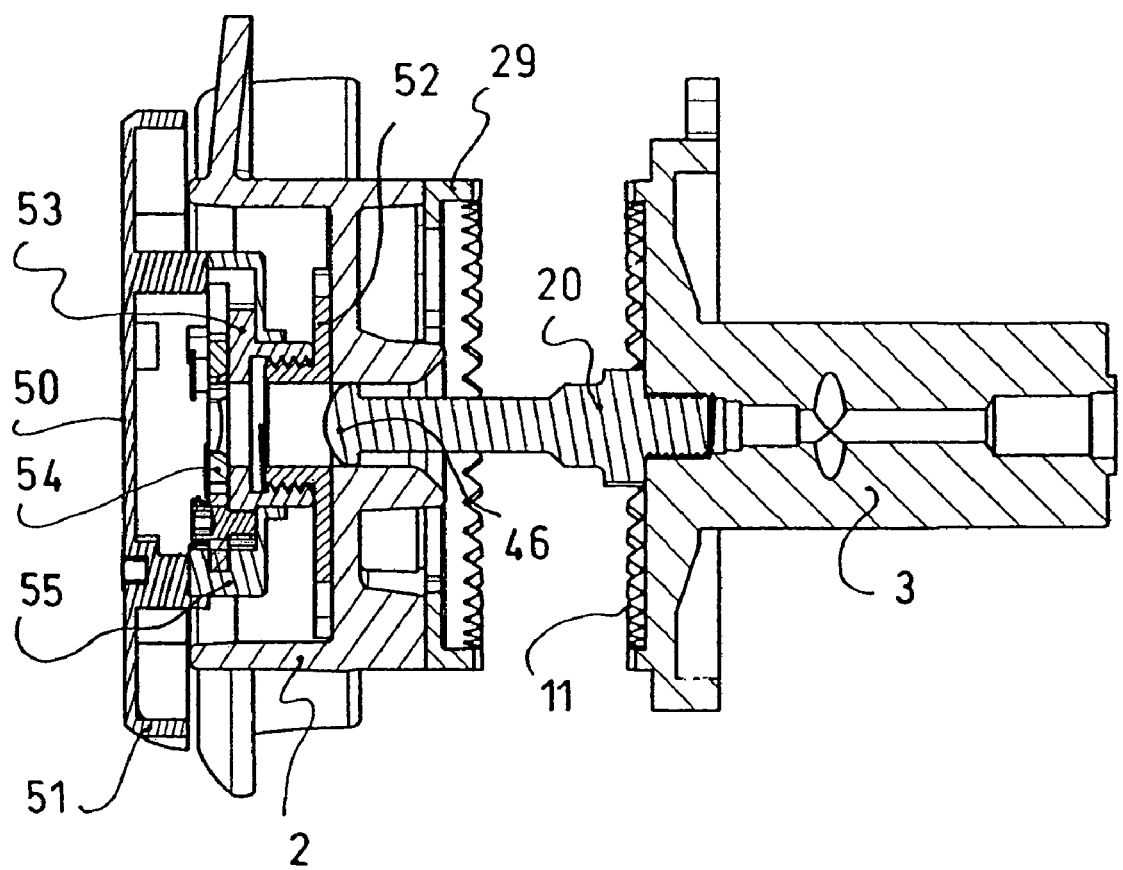
FIG. 13 shows a partial cross-sectional view of the sixth embodiment of the invention.

FIG. 12 shows a front view of a sixth embodiment, in which the wheel is partially represented by seven compression spokes 6. The actuation handle 50 of the quick-tightening mechanism includes six protuberances 51 that make it easier to grab the same. This handle is also used to grab the wheel with one hand. FIG. 13 shows the same wheel fixing device, including a quick-tightening mechanism. With respect to the bicycle, only the inner hub 3 is shown. As in the preceding embodiments, the latter is shown to be rotatable on the frame and receives the free-wheel sprockets, when mounting a rear wheel and/or a braking disk. An axial support arrangement/zone, constituted by a plurality of teeth 11 arranged along a circle, is provided on the inner hub. The inner hub also includes a pin 20 that projects from the center thereof. The pin 20, which constitutes the male portion of the quick-tightening mechanism, is screwed within a threaded hole and has, at its projecting end, a head 46 that includes a substantially rounded front surface and a substantially planar rear surface oriented along a plane perpendicular to the axis of the wheel. To the outer hub 2 the seven compression spokes of the wheel are connected, the outer hub also including a toothed crown 29 capable of cooperating with the plurality of teeth arranged on the inner hub 3. The female portion of the quick-tightening mechanism includes a hollow screw 52, a nut 53, a diaphragm 54, a cupped plate 55, and a handle 50. The handle 50 and the plate 55 are fixed to one another by three screws not shown in this cross-section, so that these two elements are connected to one another, both rotationally and translationally. The nut 53 includes a first portion that is a threaded cylindrical bushing and second portion in the form of a flat washer. It is inserted into the cupped plate 55, the bushing being free to rotate relative to the latter in an opening thereof, while the washer takes support on the plate to prevent the nut 53 and the plate 55 from being disengaged.

Figure 14:
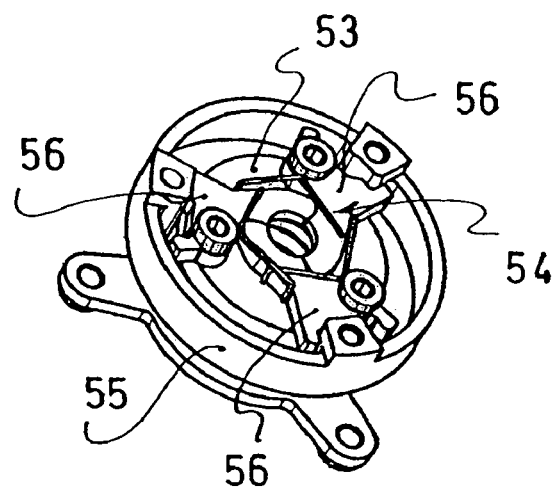
FIG. 14 shows a perspective view of the diaphragm of the sixth embodiment of the invention.

FIG. 14 is a perspective view of the cupped plate 55, the nut 53, and the diaphragm 54 before the plate 55 is fixed to the handle 50. The diaphragm 54 is constituted by three pivotable plates 56. Each of these plates 56 is pivotally mounted on the second portion of the nut 53. In the closed position, the three plates 56 define an opening having a diameter that is equal to the diameter of the body of the pin, but is smaller than the head 46 thereof. In the open position, the three plates 56 allow the passage of the head 46 to remain free. At rest, springs 57 retain the diaphragm in the closed position. Each of the pivotable plates 56 includes three cams 58, 59, 60 that cooperate with three projections 61 of the inner circumference of the cupped plate 55. The plates 56 also include an axial abutment surface 66 arranged on the front surface of the plate and provided to receive the rear surface of the head.

Figure 15:
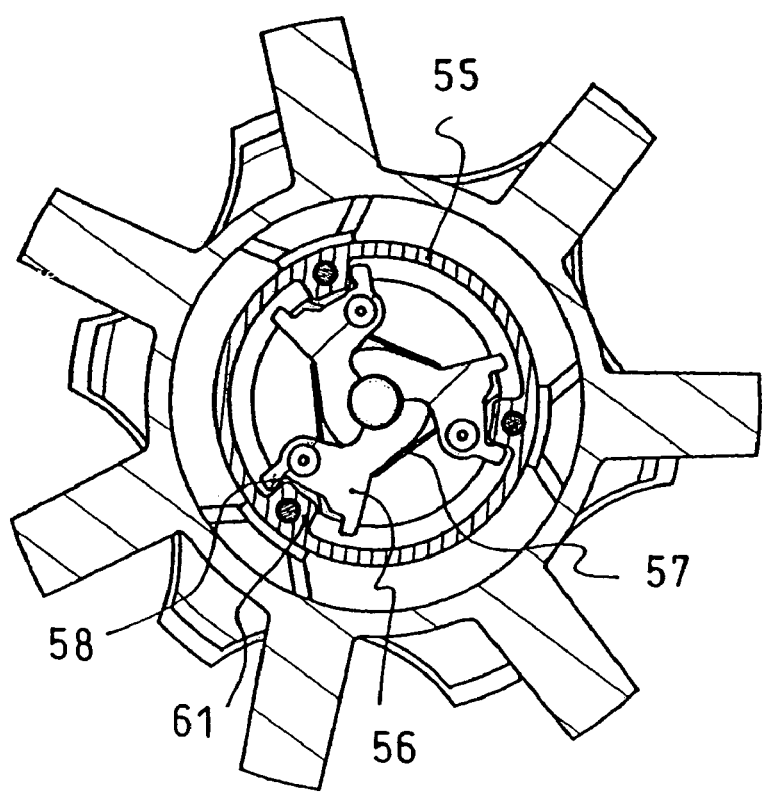
FIGS. 15, 16, and 17 show front views of the diaphragm in three different phases of use of the sixth embodiment of the invention.

FIG. 15 shows a partial cross-section of the tightening mechanism in a stable resting position, before the pin 20 is inserted. The springs 57 bring back the three plates 56 against one another. The projections 61 are in contact with the opening cams 58 of each of the plates 56. However, the latter are free to pivot in order to permit the opening of the diaphragm 54 and the passage of the pin 20.

Figure 16:
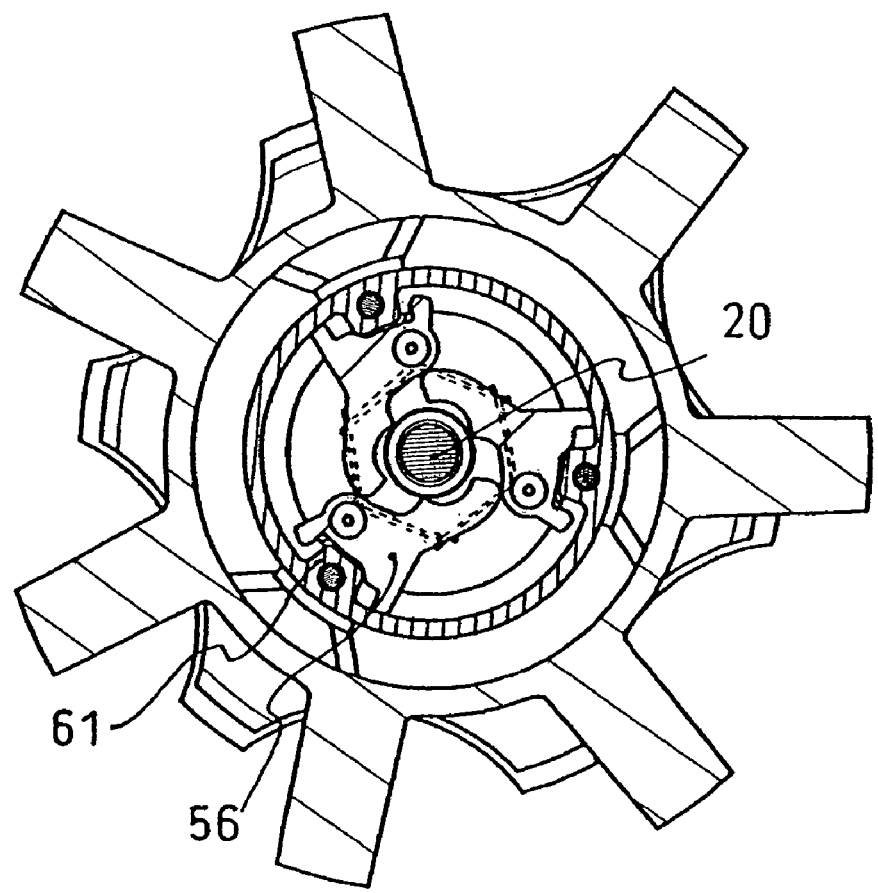

FIG. 16 shows a similar cross-section of the quick-tightening mechanism during the insertion of the pin 20. The rounded surface of the head 46 then comes in contact with the plates 56 so that they pivot and allow it to pass. To further facilitate the passage of the head 46 and the opening of the diaphragm 54, a chamfer is arranged on each of the plates 56 in the area of contact with the rounded surface of the head 46. Once the head has passed, the plates close up on the pin 20 and recover the stable resting position. The passage of the head 46 through the diaphragm 54 constitutes the phase of positioning the axial abutments of the tightening mechanism, the axial abutments being constituted by the rear surface of the head 46 and the axial abutment surfaces of the pivotable plates 56. In this embodiment, this positioning is automatically carried out as soon as the user brings the wheel closer to the inner hub. After this abutment positioning phase, the tightening phase can take place during which the positioning is then inactive.

Figure 17:
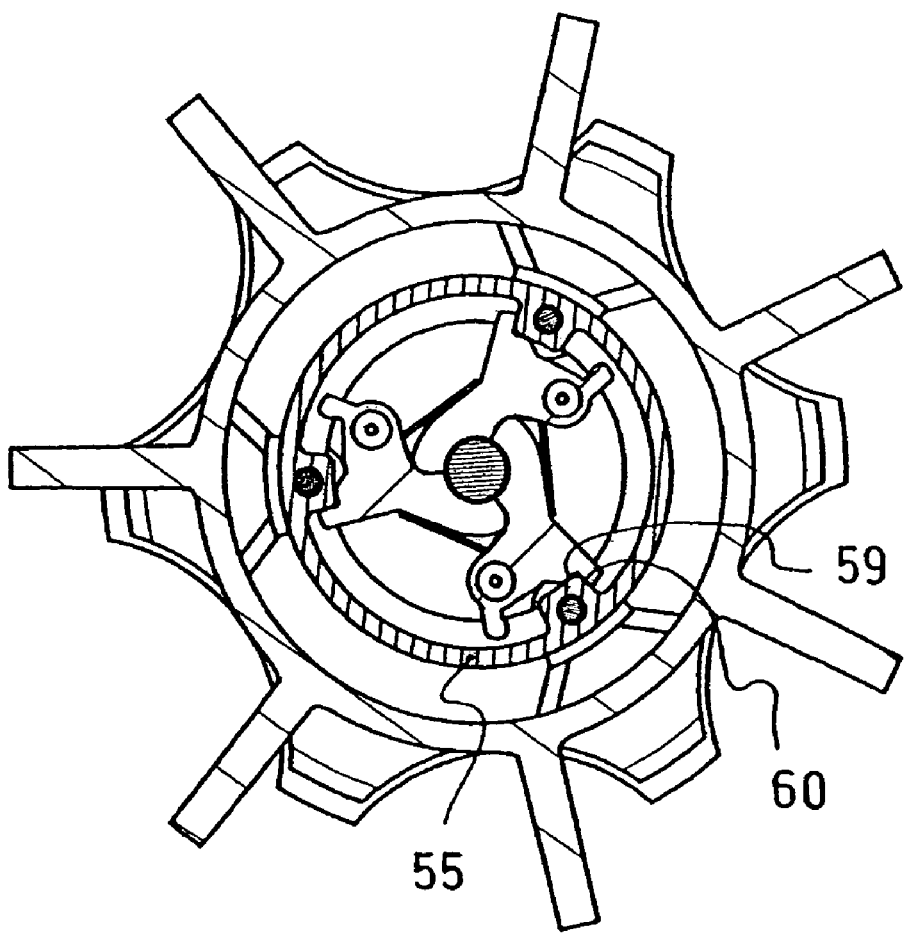

FIG. 17 shows a cross-section of the tightening mechanism during the tightening phase. First, the rotation of the handle in the tightening direction by the user brings the projections 61 of the cupped plate 55 in contact with the closure cams 59, on the one hand, and with the tightening cams 60, on the other hand. The contact between the projections 61 and the closure cams 59 henceforward prevents the pivoting of the plates and therefore the opening of the diaphragm 54. Second, the rotation of the handle by the user results in rotationally driving the diaphragm 54 via the contact established between the projections 61 and the tightening cams 60. The nut 53, on which the diaphragm 54 is fixed, is also rotationally driven, and as the threading of the latter has a left-handed pitch, the handle tightening movement initiated by the user "loosens" the hollow screw 52/nut 53 connection. The term "loosening" is used here, although this is not actually a loosening, but rather a spacing apart of the nut 53, and of the diaphragm attached thereto, from the hollow screw 52.

Figure 18:
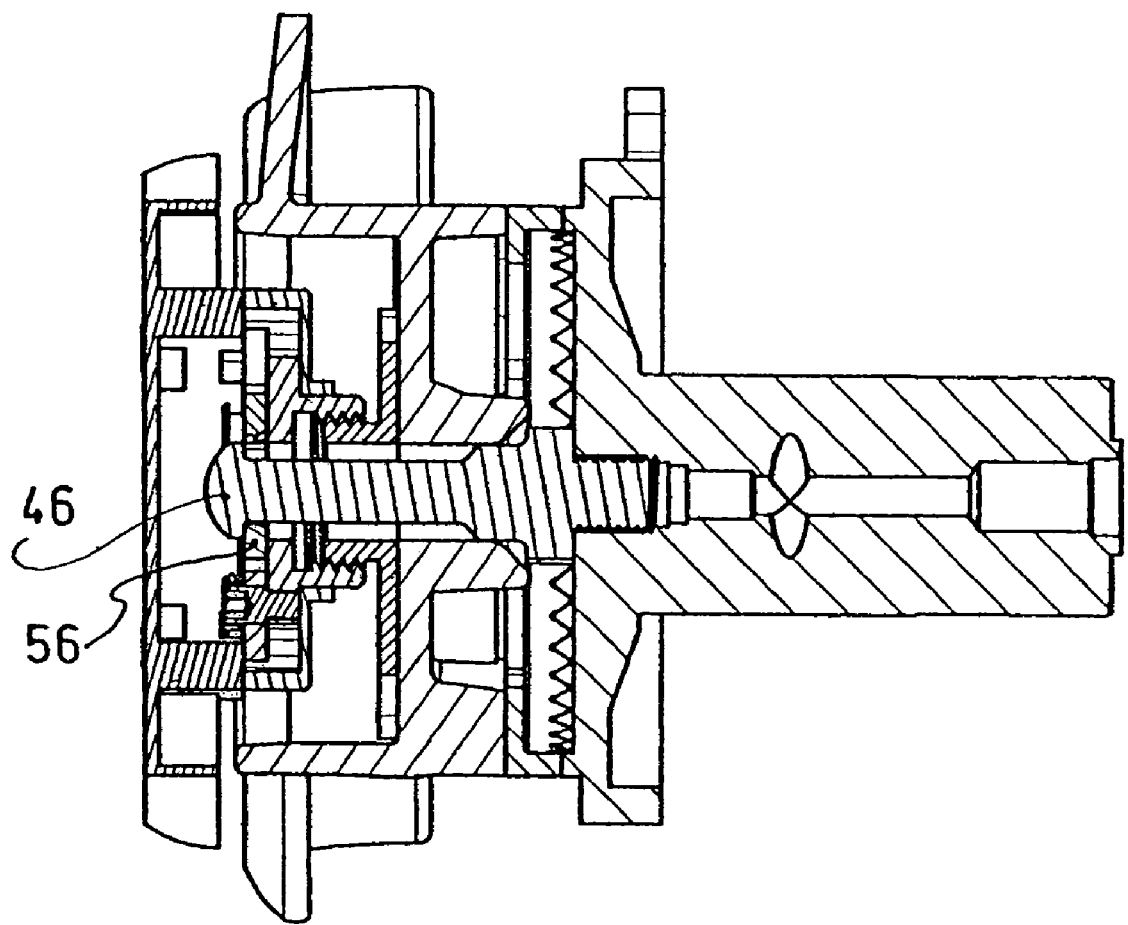
FIG. 18 shows a longitudinal cross-sectional view of the sixth embodiment of the invention when the wheel is positioned and tightened.

FIG. 18 shows a longitudinal cross-sectional view of the inner hub, of the outer hub, and of the tightening mechanism in the tightened position. While the nut is "loosened" to the maximum, the plates 56 are pressed against the rear surface of the head 46. In this figure, it can be seen that the largest portion of the plates is in support against the washer that is integrated into the nut 53. Only a small portion thereof is not in support on the washer. This portion overhangs and is subjected to the forces that are used to retain the wheel in position on the inner hub. Although this portion overhangs, the center of gravity of this portion is located within the polygon defined by the end support points of the plate 56 on the washer of the nut 53. Even under the forces exerted by the head, the plates do not become deformed and only work in shearing. In this position, the tightening is ensured and a safety device preventing the loosening completes the tightening mechanism.

Demounting the wheel requires from the user to actuate the handle in the usual unscrewing direction. Initially, the handle, as well as the cupped plate 51 that is affixed thereto, is displaced relative to the nut 53 and to the plates 56. The projections 61 exit the contact with the tightening cams 60, and the rotation is carried out until the latter come in contact with the opening cams 58. At that moment, the contact pressure between the plates 56 and the head 46 is still too strong, and the rotation of the handle 50 drives that of the diaphragm 54. When the latter is weaker, the rotation causes the plates 56 to tilt, and therefore opens the diaphragm 54. It then becomes possible to remove the wheel, although it might be found preferable to reinitialize the position of the nut 53 by rotating the handle a little further. Once the actuation of the handle by hand is completed, the springs bring back the diaphragm 54 and the pivotable plates 56 that constitute it in the stable position.

The invention is not limited to the several embodiments described herein by way of example. Other equivalent embodiments can also be envisioned. For example, the embodiment described in FIGS. 9-11 can be equipped with a knuckle-joint lever having a safety device, such as described in the first embodiment in FIGS. 1-5 and 19-21. Also, the embodiments described in FIGS. 7 and 8 can be modified by inverting the positioning of the male and female portions of the quick-tightening mechanism. Finally, the handle and the screw/nut system of the embodiment of FIGS. 12-18 can be replaced with a system using a lever.

LIST OF ELEMENTS

1—wheel
2—outer hub
3—inner hub
4—frame
5—rolling bearing
6—compression spoke
7—tightening mechanism
8—cover
9—cage
10—plate
11—tooth
12—screws
13—opening
14—outer axial support arrangement
15—nut
16—cylindrical body
17—free wheel body
18—braking disk
19—axis of rotation
20—pin
21—base
22—groove
23—end piece
24—rim
25—wheel median plane
26—lever
27—ball
28—rod
29—crown
30—first washer
31—second washer
32—widening
33—cell
34—lid
35—housings
36—chamfer
37—ramp
40—bushing (FIG. 7)
41—cam
42—spiral spring
43—cavity
44—shoulder
45—collar
46—head
47—elastic ring 48—plate
49—swivel pin
50—handle
51—protuberances
52—hollow screw
53—nut
54—diaphragm
55—cupped plate
56—pivotable plate
57—springs
58—opening cam
59—closure cam
60—tightening cam
61—projections
62—transverse bore
63—slit
64—lip
65—cap
66—axial abutment surface
67—push-button
68—lever body
69—latch
70—spring for push-button
71—latch spring
72—return spring
73—latch ramp
74—lever opening
75—inclined plane

The invention claimed is:

1. A device for mounting a bicycle wheel onto a frame, said device comprising:
an inner hub adapted to be rotatably mounted on a portion of the frame;
an outer hub comprising a central zone of the wheel, the outer and inner hubs adapted to be retained against each other when the wheel is mounted upon the frame;
a quick-tightening mechanism comprising:
a male portion projecting from a first of said inner and outer hubs;
a female portion provided in a second of said inner and outer hubs;
an axial abutment arrangement for retaining the outer hub against the inner hub, said axial abutment arrangement including a plurality of balls;
a positioning mechanism to position the axial abutment arrangement to position the outer hub against the inner hub, said positioning mechanism including ramps, said balls adapted to roll upon said ramps, said positioning mechanism being inactive upon completion of the tightening;
a lever adapted to be pivoted by a user to provide force for axial tightening of said outer hub of the wheel against said inner hub.

2. A device for mounting a bicycle wheel according to claim 1, wherein:
said female portion of said quick-tightening mechanism comprises a cage, said cage comprising peripheral housings, each of said housings receiving respective ones of said plurality of balls, and translationally driven by the rotation of said lever, as well as a pin constituting said male portion.

3. A device for mounting a bicycle wheel according to claim 1, wherein:
said axial abutment arrangement includes two pivotable cams retained within a bushing;
said mechanism for positioning said axial abutment arrangement comprises two openings in said bushing and a spiral spring biasing the two cams to project from the bushing through said openings.

4. A device for mounting a bicycle wheel according to claim 1, wherein:
said axial abutment arrangement includes cams; and
said mechanism for positioning the axial abutment arrangement comprises a collar on which the cams slide.

5. A device for mounting a bicycle wheel according to claim 1, wherein:
said axial abutment arrangement includes a head and a plate having an opening, the shape of said plate being complementary to a shape of said head; and
said mechanism for positioning the axial abutment arrangement comprises a mechanism enabling the rotation of the head.

6. A device for mounting a bicycle wheel according to claim 1, wherein:
said axial abutment arrangement includes pivotable plates forming a diaphragm; and
said mechanism for positioning said axial abutment arrangement includes springs for biasing said pivotable plates to a stable resting position.

7. A device for mounting a bicycle wheel according to claim 1, further comprising:
a safety device capable of preventing an accidental opening.

8. A device for mounting a bicycle wheel according to claim 1, wherein:
said inner hub includes a plate having a plurality of teeth, arranged along a first circle, said teeth projecting from said plate;
said outer hub also includes a plurality of teeth, arranged along a second circle having the same diameter as the first circle; and
said quick-tightening mechanism is located within said first and second circles.

9. A device for mounting a bicycle wheel according to claim 1, wherein:
said quick-tightening mechanism comprises a manipulation member movable between an open position prior to completion of tightening and a closed position upon completion of tightening;
said device for mounting a bicycle wheel further comprising a safety device capable of preventing an accidental movement of said manipulation member to said open position.

10. A device for mounting a bicycle wheel according to claim 9, wherein:
said safety device comprises means requiring a manipulation additional to movement of said manipulation member between said open and closed positions.

11. A device for mounting a bicycle wheel according to claim 1, wherein:
said positioning mechanism animates said axial abutment arrangement along a radial movement.

12. A device for mounting a bicycle wheel onto a frame, said device comprising:
an inner hub adapted to be rotatably mounted on a portion of the frame;
an outer hub comprising a central zone of the wheel, the outer and inner hubs adapted to be retained against each other during a mounted position of the wheel on the frame;
a mechanism for tightening the outer hub when retained against the inner hub, said tightening mechanism comprising:

a male portion projecting from a first of said inner and outer hubs;

a female portion provided in a second of said inner and outer hubs;

a plurality of axial abutment elements through which force is applied for retaining the outer hub against the inner hub;

a positioning mechanism to move the axial abutment elements to a position allowing the outer hub to be positioned against the inner hub and, thereby, allowing the wheel to be moved to said mounted position on the frame;

a manipulation member, adapted to be manipulated by the user, having a range of movement, said range of movement comprising a first part and a second part, wherein:

during said first part of said range of movement, said axial abutment elements are caused to be moved axially and radially by said positioning mechanism, thereby causing the wheel to assume said mounted position on the frame;

during said second part of said range of movement, said positioning mechanism not causing movement of said axial abutment elements.

13. A device for mounting a bicycle wheel according to claim 12, wherein:

said manipulation member comprises a cam-lever for axial tightening of said outer hub of the wheel against said inner hub.

14. A device for mounting a bicycle wheel according to claim 12, wherein:

during said second part of said range of movement of said manipulation member, said axial abutment members are moved only axially.

15. A device for mounting a bicycle wheel according to claim 12, wherein:

during said second part of said range of movement of said manipulation member, said axial abutment members are moved only axially during tightening of said outer hub against said inner hub.

16. A device for mounting a bicycle wheel according to claim 12, wherein:

during said second part of said range of movement of said manipulation member, said axial abutment members are moved axially during tightening of said outer hub against said inner hub;

at an end of said second part of said range of movement of said manipulation member, said axial abutment members engage an enlargement of said male portion.

17. A device for mounting a bicycle wheel onto a frame, said device comprising:

an inner hub adapted to be rotatably mounted on a portion of the frame;

an outer hub comprising a central zone of the wheel, the outer and inner hubs adapted to be retained against each other during a mounted position of the wheel on the frame;

a mechanism for tightening the outer hub when retained against the inner hub, said tightening mechanism comprising:

a male portion projecting from a first of said inner and outer hubs;

a female portion provided in a second of said inner and outer hubs;

a plurality of axial abutment elements, a force for retaining said outer hub against said inner hub adapted to be applied through said axial abutments;

means for positioning said axial abutment elements in a position to allow the wheel to be moved to said mounted position on the frame during a wheel mounting phase, said means comprising means for causing said axial abutment elements to move axially and radially during the wheel mounting phase; and means for tightening said outer and inner hubs during said mounted position of the wheel, said means comprising means for moving said axial abutment elements axially during a wheel tightening phase;

said means for positioning being inactive during said wheel tightening phase.

18. A device for mounting a bicycle wheel according to claim 17, wherein:

said means for tightening comprises a manipulation member adapted to be manipulated by a user, said manipulation member having a range of movement, said range of movement comprising a first part during said wheel mounting phase and a second part during said wheel tightening phase.

19. A device for mounting a bicycle wheel according to claim 18, wherein:

said means for positioning comprises a ramp forcing said axial abutment elements to move radially during said wheel mounting phase.

20. A device for mounting a bicycle wheel according to claim 17, wherein:

during said wheel tightening phase, said axial abutment members are moved only axially.

21. A device for mounting a bicycle wheel according to claim 17, wherein:

during said wheel tightening phase, said axial abutment members are moved axially during tightening of said outer hub against said inner hub;

at an end of said wheel tightening phase, said axial abutment members engage an enlargement of said male portion.

* * * * *